(12) United States Patent
Lindbo et al.

(10) Patent No.: US 11,345,543 B2
(45) Date of Patent: May 31, 2022

(54) METHOD AND APPARATUS FOR RETRIEVING UNITS FROM A STORAGE SYSTEM

(71) Applicant: OCADO INNOVATION LIMITED, Hatfield (GB)

(72) Inventors: Lars Sverker Ture Lindbo, Hatfield (GB); Andrew John Ingram-Tedd, Hatfield (GB); Pawel Karolinczak, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 16/338,205

(22) PCT Filed: Oct. 2, 2017

(86) PCT No.: PCT/EP2017/075018
§ 371 (c)(1),
(2) Date: Mar. 29, 2019

(87) PCT Pub. No.: WO2018/060527
PCT Pub. Date: Apr. 5, 2018

(65) Prior Publication Data
US 2019/0225436 A1    Jul. 25, 2019

(30) Foreign Application Priority Data

Sep. 30, 2016   (GB) ..................................... 1616597

(51) Int. Cl.
*B65G 1/04*    (2006.01)
*B65G 1/14*    (2006.01)
(Continued)

(52) U.S. Cl.
CPC ......... *B65G 1/0464* (2013.01); *B65G 1/0478* (2013.01); *B65G 1/14* (2013.01); *B65G 67/44* (2013.01); *B65G 67/46* (2013.01)

(58) Field of Classification Search
CPC .. B65G 1/0464; B25J 15/0052; B25J 15/0061
(Continued)

(56) References Cited

U.S. PATENT DOCUMENTS 2,701,065 A    2/1955  Bertel
3,179,460 A *  4/1965  Gunzelmann ........... B66C 1/442
                                                      294/63.1
(Continued)

FOREIGN PATENT DOCUMENTS

EP    0767113 A2    4/1997
EP    1359101 A2    11/2003
(Continued)

OTHER PUBLICATIONS

International Search Report (PCT/ISA/210) dated Jan. 2, 2018, by the Japan Patent Office as the International Searching Authority for International Application No. PCT/EP2017/075018.
(Continued)

*Primary Examiner* — James Keenan
(74) *Attorney, Agent, or Firm* — Buchanan Ingersoll & Rooney PC

(57) ABSTRACT

A load handling device is disclosed for use in a storage system in which goods are stored in stackable containers within a framework. An exemplary load handling device can include a container-receiving space into which a plurality of containers can be lifted. The container-receiving space can be arranged beneath a corresponding number of vehicle modules as containers to be lifted, and components such as power components, control components, drive components and lifting components are housed.

18 Claims, 26 Drawing Sheets

(51) Int. Cl.
*B65G 67/44* (2006.01)
*B65G 67/46* (2006.01)

(58) Field of Classification Search
USPC ........................................................ 294/87.1
See application file for complete search history.

(56) References Cited

U.S. PATENT DOCUMENTS

| | | | |
|---|---|---|---|
| 9,796,080 | B2 | 10/2017 | Lindbo et al. |
| 10,442,621 | B2 * | 10/2019 | Bestic ................ B65D 81/2015 |
| 10,556,742 | B2 | 2/2020 | Lindbo et al. |
| 2011/0106300 | A1 | 5/2011 | Wang et al. |
| 2015/0098775 | A1 * | 4/2015 | Razumov ............ B65G 1/0464 414/282 |
| 2015/0127143 | A1 | 5/2015 | Lindbo et al. |
| 2015/0291357 | A1 | 10/2015 | Razumov |
| 2016/0129587 | A1 | 5/2016 | Lindbo et al. |
| 2016/0145058 | A1 | 5/2016 | Lindbo |
| 2016/0194151 | A1 | 7/2016 | Lindbo et al. |
| 2017/0129702 | A1 | 5/2017 | Hognaland |
| 2018/0043528 | A1 | 2/2018 | Lindbo et al. |
| 2018/0194571 | A1 * | 7/2018 | Fryer .................... B65G 45/24 |
| 2020/0223629 | A1 | 7/2020 | Lindbo et al. |
| 2020/0307911 | A1 * | 10/2020 | Austrheim ........... B65G 1/0464 |

FOREIGN PATENT DOCUMENTS

| | | | | |
|---|---|---|---|---|
| GB | 2088823 | A * | 6/1982 | ............. B66C 1/46 |
| GB | 2525309 | A | 10/2015 | |
| JP | 61045826 | A * | 3/1986 | ........... B65G 1/0464 |
| JP | H04235822 | A | 8/1992 | |
| JP | H11278607 | A | 10/1999 | |
| JP | 2000188319 | A | 7/2000 | |
| JP | 2015189523 | A | 11/2015 | |
| JP | 2015208837 | A | 11/2015 | |
| JP | 2016-525490 | A | 8/2016 | |
| JP | 2016-529181 | A | 9/2016 | |
| NO | 317366 | B1 | 10/2004 | |
| WO | 9849075 | A1 | 11/1998 | |
| WO | 2013167907 | A1 | 11/2013 | |
| WO | 2014195901 | A1 | 12/2014 | |
| WO | 2015019055 | A1 | 2/2015 | |
| WO | 2015193278 | A1 | 12/2015 | |
| WO | 2016063197 | A1 | 4/2016 | |

OTHER PUBLICATIONS

Patents Act 1977: Search Report under Section 17 dated Mar. 28, 2018, issued in corresponding United Kingdom Application No. GB1716085.4.

Written Opinion (PCT/ISA/237) dated Jan. 2, 2018, by the Japan Patent Office as the International Searching Authority for International Application No. PCT/EP2017/075018.

First Office Action dated Feb. 9, 2021, by the Japanese Patent Office in corresponding Japanese Patent Application No. 2019-517842, and an English Translation of the Office Action. (10 pages).

Office Action (Notification of Reason for Refusal) dated Jun. 22, 2021, by the Korean Patent Office in corresponding Korean Patent Application No. 10-2019-7012178, and an English Translation of the Office Action. (17 pages).

First Office Action dated Nov. 30, 2021, by the Japanese Patent Office in corresponding Japanese Patent Application No. 2019-517842, and an English Translation of the Office Action. (11 pages).

Office Action dated Nov. 16, 2021, by the Canadian Patent Office in corresponding Canadian Patent Application No. 3,038,890 (6 pages).

* cited by examiner

METHOD AND APPARATUS FOR RETRIEVING UNITS FROM A STORAGE SYSTEM

The present invention relates to apparatus for retrieving units form a storage system. In particular, but not exclusively, the invention relates to robotic devices for handling storage containers or bins in a store comprising a grid of stacked units.

This application claims priority from UK Patent Application No GB1616597.9 filed on 30 Sep. 2016, hereby incorporated by reference.

Some commercial and industrial activities require systems that enable the storage and retrieval of a large number of different products. One known system for the storage and retrieval of items in multiple product lines involves arranging storage bins or containers on rows of shelves arranged in aisles. Each bin or container holds a plurality of products of one product type. The aisles provide access between the rows of shelves, so that the required products can be retrieved by operatives or robots that circulate in the aisles. It will be appreciated, however, that the need to provide aisle space to access the products means that the storage density of such systems is relatively low. In other words, the amount of space actually used for the storage of products is relatively small compared to the amount of space required for the storage system as a whole.

In an alternative approach, which offers a significant improvement in storage density, containers are stacked on top of one another and the stacks are arranged in rows. The containers are accessed from above, removing the need for aisles between the rows and allowing more containers to be stored in a given space.

Methods of handling containers stacked in rows have been well known for decades. In some such systems, for example as described in U.S. Pat. No. 2,701,065, freestanding stacks of containers are arranged in rows in order to reduce the storage volume associated with storing such containers while still providing access to a specific container if required. Access to a given container is made possible by providing relatively complicated hoisting mechanisms which can be used to stack containers and to remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B (Cimcorp). Cimcorp discloses a mechanism for removing a plurality of stacked containers using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack). The load handler can be used to move containers between single-product stacks, for example to add a plurality of containers containing a single type of product to the store, and to pick up one or more containers from two or more single-product stacks to create a multi-product output stack. An example of this is the picking of vegetable crates in a central warehouse to create a multi-product order for delivery to retail stores.

In the system described in Cimcorp, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler. Furthermore, the system is not well adapted for the selection of a single container from a multi-product stack.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

Accordingly, for some applications, the use of multi-product stacks, in which the containers making up each stack may hold different products, is favoured in order to maximise the storage density of the system. The stored items must remain accessible reasonably quickly and easily, so that a plurality of different items required to fulfil a customer order can be picked from the storage system in an efficient way, even if some of the items required are stored in a lower level of a stack, underneath several other containers.

International patent application WO 98/049075A (Autostore), the contents of which are incorporated herein by reference, describes a system in which multi-product stacks of containers are arranged within a frame structure. A system of this type is illustrated schematically in FIGS. 1 to 4 of the accompanying drawings.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

The load handling devices 30 are further described in Norwegian patent number 317366, the contents of which are incorporated herein by reference. FIGS. 3(a) and 3(b) are schematic perspective views of a load handling device 30 from the rear and front, respectively, and FIG. 3(c) is a schematic front perspective view of a load handling device 30 lifting a bin 10.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a crane device 40. The crane device 40 comprises a cantilever arm 42 that extends laterally from the top of the vehicle 32. A gripper plate 44 is suspended from the cantilever arm 42 by four cables 46. The cables 46 are connected to a winding mechanism (not shown) housed within the vehicle 32. The cables 46 can be spooled in or out from the cantilever arm 42, so that the position of the gripper plate 44 with respect to the vehicle 32 can be adjusted in the Z direction.

The gripper plate 44 is adapted to engage with the top of a bin 10. For example, the gripper plate 44 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 44, which is powered and controlled by signals carried through the cables 46 themselves or through a separate control cable (not shown).

To remove a bin 10 from the top of a stack 12, the load handling device 30 is moved as necessary in the X and Y directions so that the gripper plate 44 is positioned above the stack 12. The gripper plate 44 is then lowered vertically in the Z direction to engage with the bin 10 on the top of the stack 12, as shown in FIG. 3(c). The gripper plate 44 grips the bin 10, and is then pulled upwards on the cables 46, with the bin 10 attached. At the top of its vertical travel, the bin 10 is accommodated beneath the cantilever arm 42 and is held above the level of the rails 22. In this way, the load handling device 30 can be moved to a different position in the X-Y plane, carrying the bin 10 along with it, to transport the bin 10 to another location. The cables 46 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34, 36.

As shown in FIG. 4, a plurality of identical load handling devices 30 are provided, so that each load handling device 30 can operate simultaneously to increase the throughput of the system. The system illustrated in FIG. 4 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10.

Each of the load handling devices 30 is under the control of a central computer. Each individual bin 10 in the system is tracked, so that the appropriate bins 10 can be retrieved, transported and replaced as necessary.

The system described with reference to FIGS. 1 to 4 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

For high-volume systems in which speed of operation is critical, it is important to maximise the performance of each of the load handing devices, in terms of speed of operation, battery life, reliability, lifting capacity, stability and so on. It may therefore be desirable to provide load-handling devices that offer improved performance in one or more of these areas.

It may also be desirable to increase the number of load handling devices in use at any one time, to allow an increase in the speed with which items can be retrieved from the storage system. For example, the Applicant's co-pending International Patent Application No. PCT/GB2013/051215, the content of which is incorporated herein by reference, describes a storage system in which a plurality of each of two different types of load handling device are provided. One type of load handling device is adapted to lift a plurality of bins from a stack in one operation, to allow a target bin in the stack to be accessed by a single-bin load handling device of the second type. In such cases, it may be desirable to reduce the size of the load handling devices in order to minimise instances in which the optimum movement path for one device is hindered by the presence of other devices.

Load handling devices of the type described above are expensive and it is an object of the present invention to reduce the electronics and control mechanisms by providing a single load handling device capable of lifting and carrying multiple containers.

It is against this background that the present invention has been devised.

According to the invention there is provided a load handling device for lifting and moving containers stacked in a storage system comprising a plurality of rails or tracks arranged in a grid pattern above the stacks of containers, the grid pattern comprising a plurality of grid spaces and each stack being located within a footprint of only a single grid space, the load handling device being configured to move laterally on the rails or tracks above the stacks, the load handling device comprising a container receiving space located above the rails or tracks in use and a plurality of vehicle modules, the modules comprising container lifting means arranged to lift a corresponding number of containers as vehicle modules in to the container receiving space.

According to the invention there is further provided a storage system comprising: a first set of parallel rails or tracks and a second set of parallel rails or tracks extending substantially perpendicularly to the first set of rails or tracks to form a grid comprising a plurality of grid spaces; a plurality of stacks of containers located beneath the rails or tracks and arranged such that each stack occupies a footprint of a single grid space; a load handling device as arranged to move laterally above the stacks on the rails, the load handling device comprising a container receiving recess located above the rails and a plurality of vehicle modules, the vehicle modules comprising lifting means the lifting means arranged to lift a plurality of containers from a plurality of stacks into the container receiving space.

According to the invention there is further provided a method of transferring a plurality of containers located within a plurality of adjacent stacks in a storage system from the storage system to a shipping trolley, the method comprising the steps of: retrieving a plurality of containers from a correspondingly numbered plurality of stacks; transporting the containers in a load handling device, the load handling device comprising a plurality of vehicle modules; delivering the containers to a port location; lowering the containers on to a container receiving platform; adjusting the spacing of the containers using adjustment means; and loading the containers on to the shipping trolley.

A load handling device according to an embodiment of the invention includes a container-receiving space into which a plurality of containers can be lifted. The container-receiving space is arranged beneath a corresponding number of vehicle modules as containers to be lifted, and components such as power components, control components, drive components and lifting components are housed.

By arranging the bulky components of the load handling device above the container-receiving space, the footprint of the load handling device is reduced compared to the cantilever designs shown in FIGS. 3(a) to 3(c) and described in NO317366, in which the bulky components are housed in a vehicle module disposed to one side of the container-receiving space. Advantageously, the load handling device of the present invention occupies the space above a corresponding number of stacks in the frame as vehicle modules and containers to be lifted.

This means that, by virtue of the invention, the efficiency of operation of the storage system can be improved, because the footprint of the load handling device allows more containers to be lifted in a single operation than a load handling device capable of lifting only one container.

The load handling device preferably includes a set of wheels for supporting the load handling device above the stacks. For example, lateral movement of the load handling device may be guided by rails disposed above the frame. The rails may be arranged in a grid pattern, allowing two-dimensional movement of the load handling device in the horizontal plane. The wheels may engage with the rails. Two sets of wheels may be provided, with one set being arranged to engage with a first set of rails to guide movement of the second handling device in a first direction, and another set being arranged to engage with a second set of rails to guide movement of the second handling device in a second direction.

In an embodiment of the invention, the wheels are arranged at the periphery of the container-receiving space. The wheels may be driven by one or more motors housed in the vehicle module. Drive may be transferred from the motors in the vehicle module to the wheels by drive transfer means disposed around the container-receiving space. For example, the drive transfer means may comprise a suitable arrangement of pulleys and drive belts.

One or both set of wheels may be configured to be raised and lowered with respect to the other set of wheels. One or more wheel lift motors or other wheel lift devices may be housed in the vehicle module for this purpose.

The vehicle module may house a plurality of winches or crane devices for lifting a corresponding number of containers as vehicle modules into the container-receiving space. The crane devices may include one or more motors for lifting the containers, and the or each motor of the or each crane device may be housed in the or each vehicle module.

Each crane device may include a gripper device configured to grip a container from above. The gripper device may be suspended from cables that can be extended and retracted from the vehicle to move the gripper device vertically.

In another embodiment, the load handling device is equipped with a lifting device arranged to lift a plurality of containers from the stack into the container-receiving space. The lifting devices may comprise a pair of lifting arms, in which case the or each lifting device may comprise a gripper device mounted between the ends of the arms and arranged to grip a container from above.

In another embodiment, the or each lifting device comprises rods or cables arranged to engage with vertical channels formed in the side walls of the containers. The channels may be accessed by apertures in a top face of each container. In such an arrangement, vertically-extending spaces in the storage system are not necessary.

The rods or cables may carry an anchor mechanism arranged to engage releasably with a container. For example, the anchor mechanism may comprise one or more laterally-extendable arms for engaging a surface of the container. The anchor mechanism may be operated remotely, for example by a wire that extends through a tubular bore of the rod or cable.

A load handling device according to another embodiment of the invention comprises an upper part, a lower part including a container-receiving space, and a plurality of winch means for lifting containers into the container-receiving space. The winch means comprise winch motors which are housed in the upper part, above the container-receiving space. The lower part includes a wheel assembly to facilitate lateral movement of the load handling device with respect to the frame, and the upper part also includes at least one motor for driving one or more wheels of the wheel assembly.

The lower part may comprise a frame structure for supporting the wheels of the wheel assembly. The frame structure may be arranged around the container-receiving space. For example, the container-receiving space may be bounded on four sides by the frame structure. One or more elements of the frame structure may be moveable to raise and lower a first set of the wheels with respect to a second set of the wheels, thereby to facilitate engagement of either the first set of wheels or the second set of wheels with a first or a second set of rails or tracks, respectively. The moveable elements of the frame structure may be driven by a motor housed in the upper part of the load handling device.

The load-handling device of the invention is preferably a self-propelled robot vehicle.

From another aspect, the invention resides in a storage system comprising a frame containing a plurality of stacks of containers, and one or more load handling devices as described above. Each load handling device occupies a plurality of grid spaces, corresponding to the area occupied by a plurality of stacks of containers.

In another aspect, the invention comprises a storage system comprising a frame containing a plurality of stacks of containers, a first handling device capable of lifting a plurality of containers from a plurality of stacks in a single operation, and a second handling device capable of lifting a single container and moving the container laterally. The first and second handling devices are disposed above the frame and are independently moveable to access different stacks. The second handling device is of the type described above, but occupies a space corresponding to only one stack of containers.

In this aspect, the provision of a first handling device capable of lifting a plurality of containers from a plurality of stacks in a single operation along with a second handling device capable of lifting a single container and moving the container laterally provides an optimum solution when seeking to retrieve and move a large number of containers. In such a case, only a single lifting operations need be carried out to retrieve the plurality of target containers, which greatly increases the speed and efficiency of the retrieval process compared to prior art arrangements in which only one container can be lifted at a time.

The storage system may further comprise one or more port locations at which containers can be removed from and/or added to the storage system. The load handling device of the invention may be capable of transporting a target containers from a plurality of stacks to a port location. The containers may comprise open-topped bins. The containers may be arranged to interlock or engage with one another in the vertical direction when formed in a stack.

In a typical application, multiple handling devices may be employed so that a large number of containers can be lifted and moved simultaneously in and around the system. The handling devices may be of different types, and may be selected to balance the cost and energy consumption of the system with the speed and flexibility of operation. One benefit of the present invention is that, because the load handling devices occupy the space above a plurality of stacks, the efficiency of a multiple-device system can be improved compared to prior art load handling device designs which occupy two or more stack spaces to lift a single container. The gain in efficiency may arise from being able to accommodate more load handling devices in a given system, from optimising the routing of the device, or from a combination of these factors.

Preferably the load handling device of the invention occupies a 2×2 grid space and is capable of retrieving four containers in a single operation. Preferably the load handling device comprises four vehicle modules arranged in a 2×2 arrangement above the container-retrieving space of the load handling device. Preferably each vehicle module comprises a winch or crane lifting device for engaging with a container at the top of a stack above which the load handling device is positioned.

Preferably the load handling device carrying the plurality of containers in the container receiving space, may be transported to a position above a port location under the control of a communications and control system. Once above the port location, the winch or crane lifting means may lower the plurality of containers on to a container receiving platform, the platform comprising means for moving the lowered containers on to a container shipping trolley comprising a series of shelves in substantially a single movement. The process repeats such that a container shipping trolley may be filled a shelf at a time in order to be ready to be loaded on to a vehicle for onward shipment.

Preferred and/or optional features of each aspect of the invention may be used, alone or in appropriate combination in the other aspects of the invention also.

Figure 1:
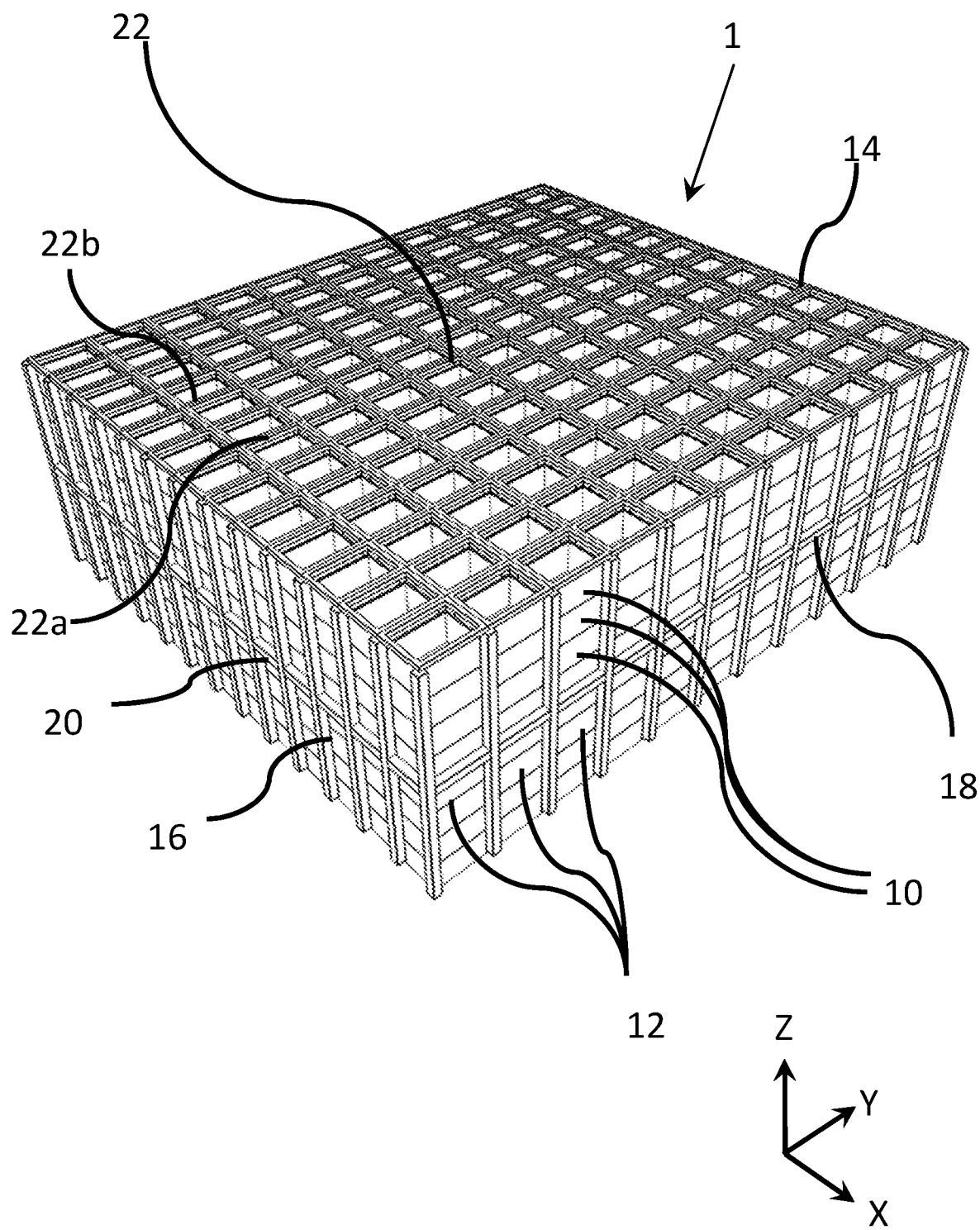
FIG. 1 is a schematic perspective view of a frame structure for housing a plurality of stacks of bins in a known storage system.
Figure 2:
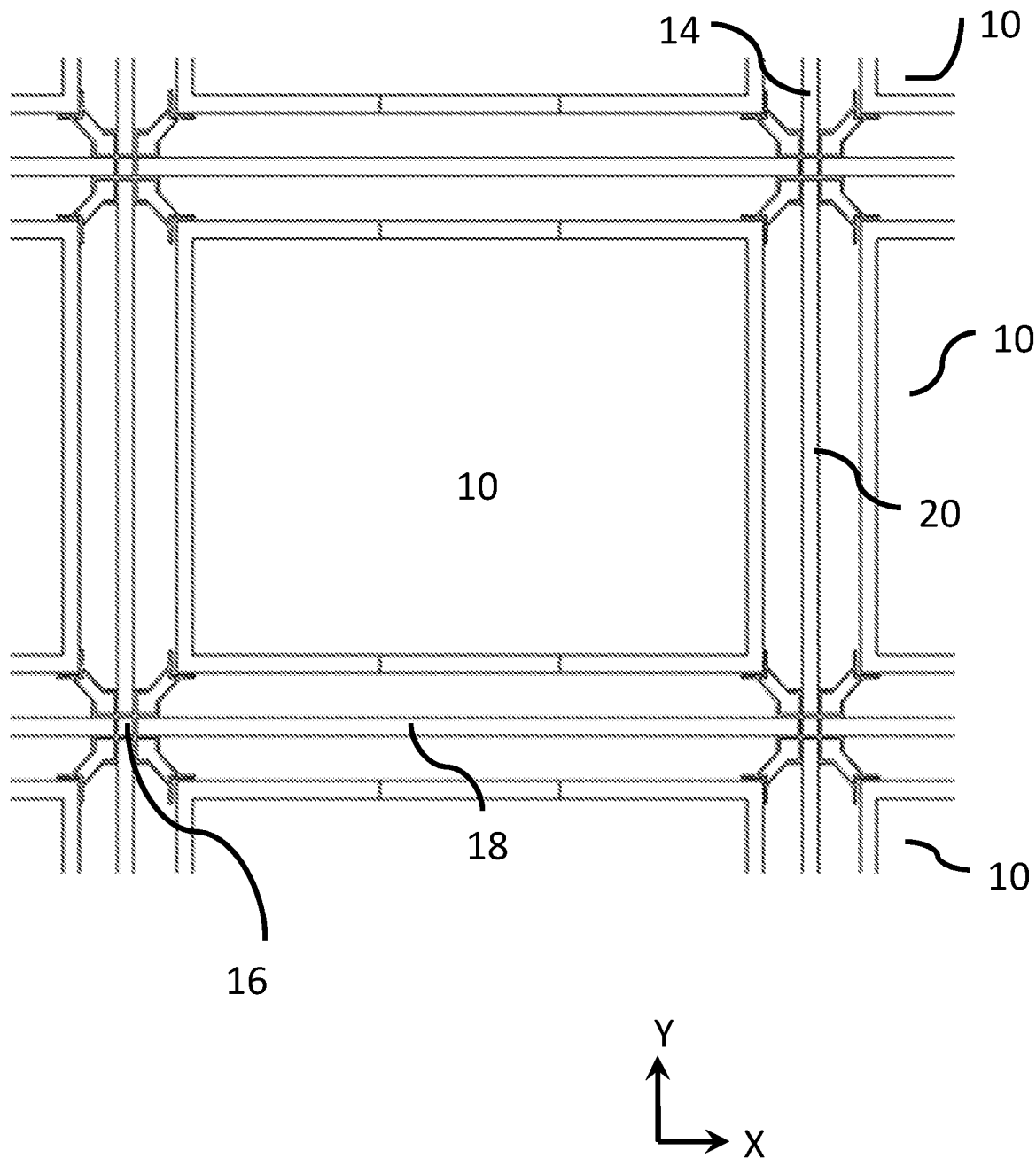
FIG. 2 is a schematic plan view of part of the frame structure of FIG. 1.
Figure 3A:
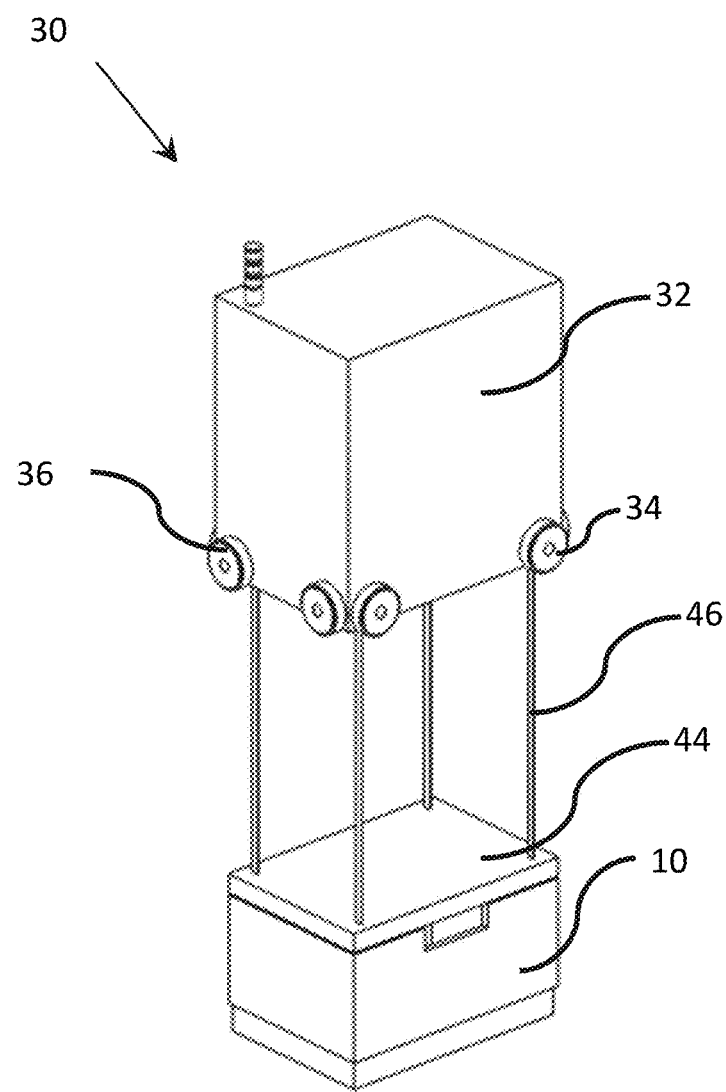
Figures 3B, 3C:
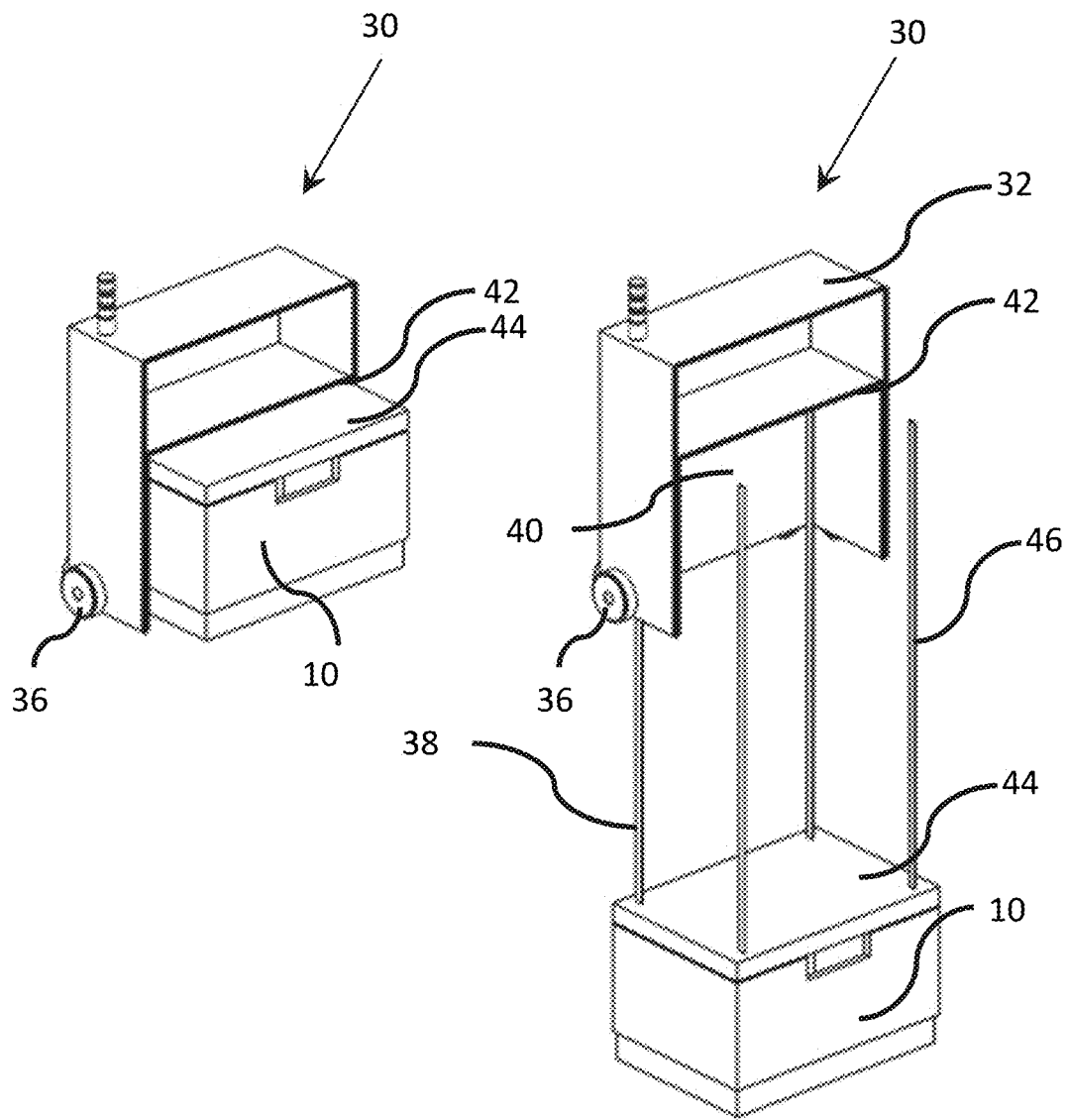
Figure 4:
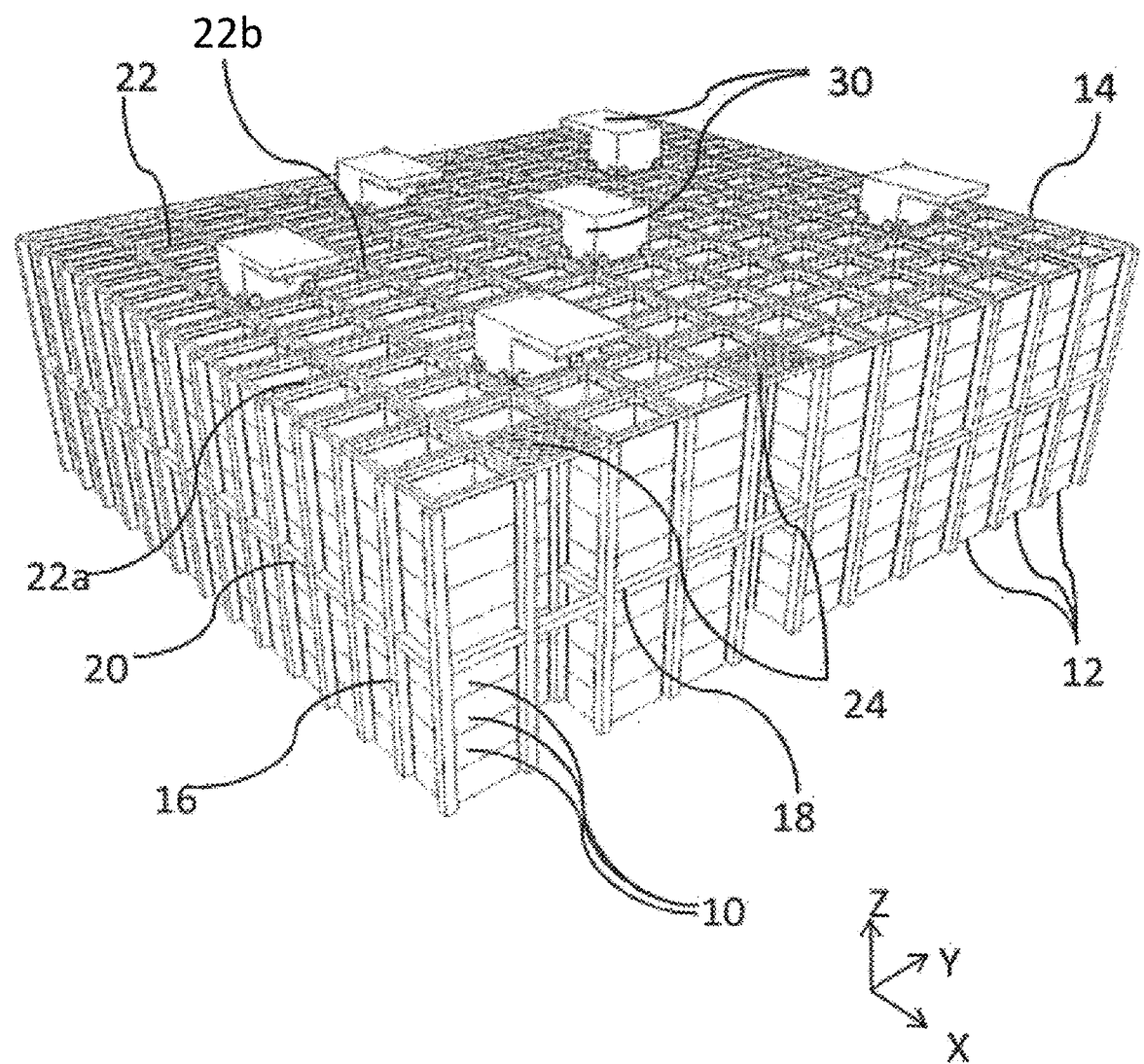

FIGS. 3(a) and 3(b) are schematic perspective views, from the rear and front respectively, of a known load handling device for use with the frame structure of FIGS. 1 and 2, and FIG. 3(c) is a schematic perspective view of the known load handling device in use lifting a bin; and FIG. 4 is a schematic perspective view of a known storage system comprising a plurality of load handling devices of the type shown in FIGS. 3(a), 3(b) and 3(c), installed on the frame structure of FIGS. 1 and 2.

Figure 5:
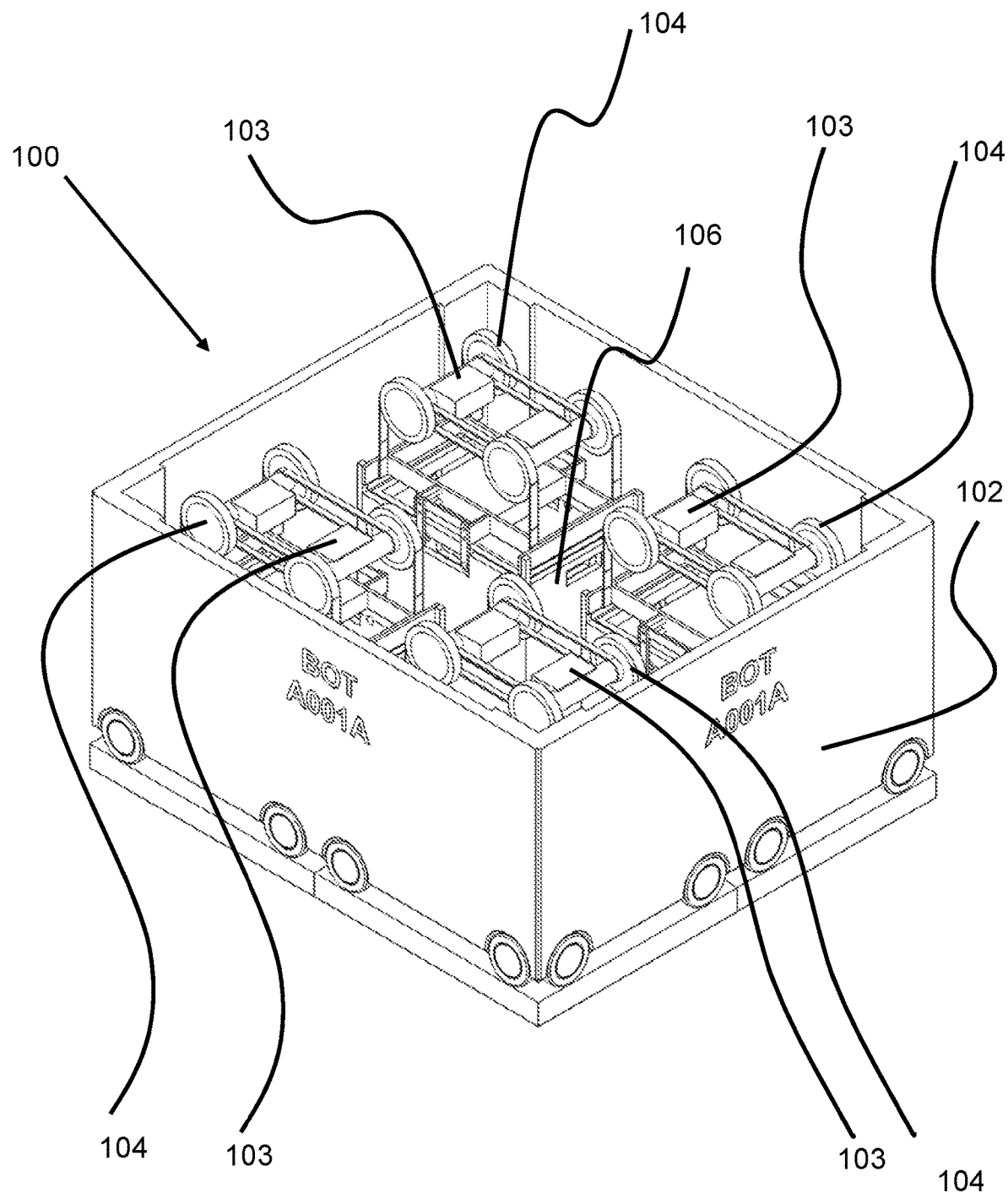
Figure 6:
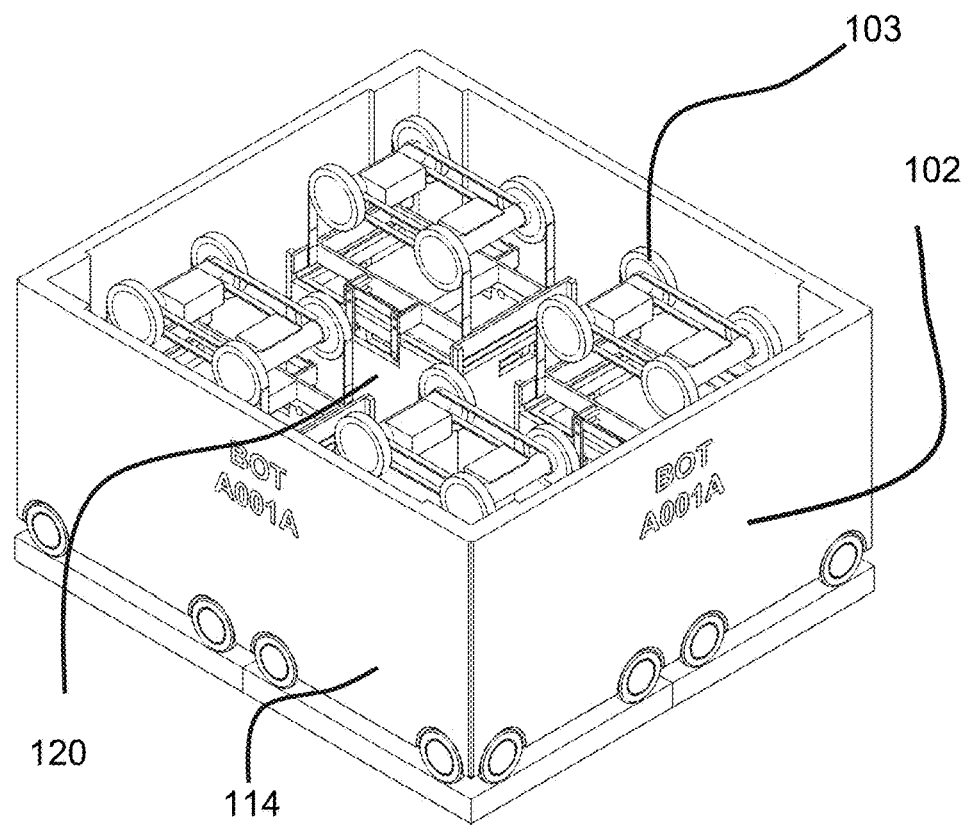
Figure 7:
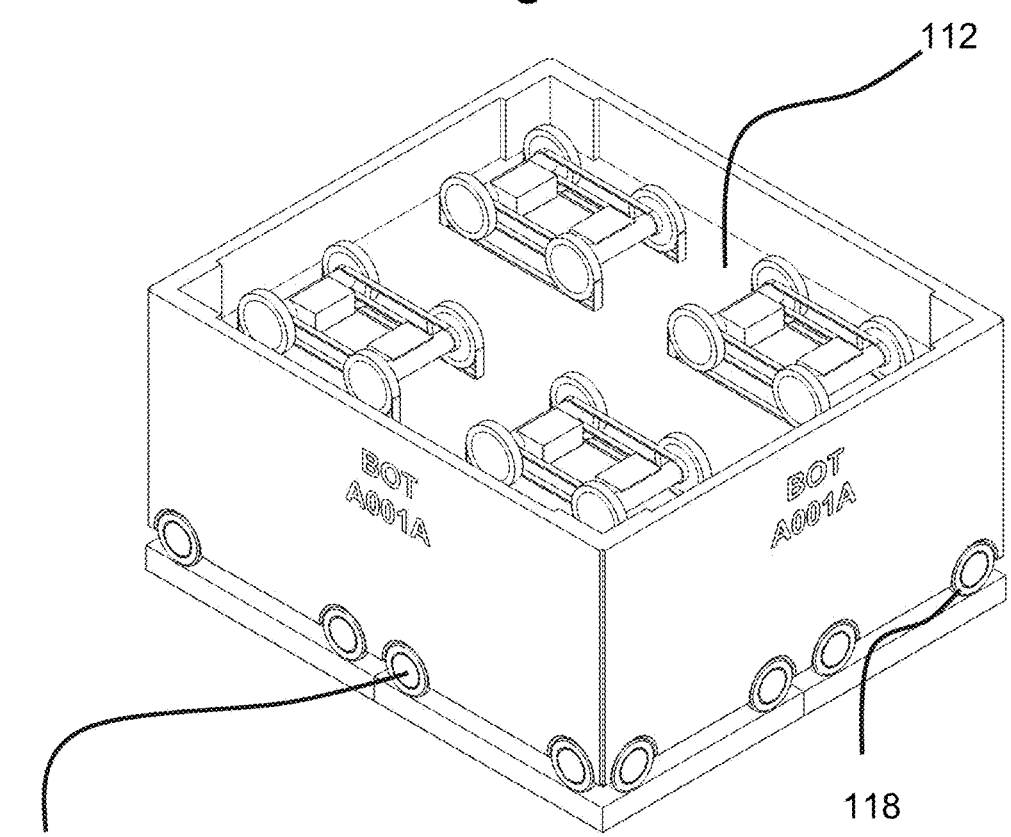
Figure 8:
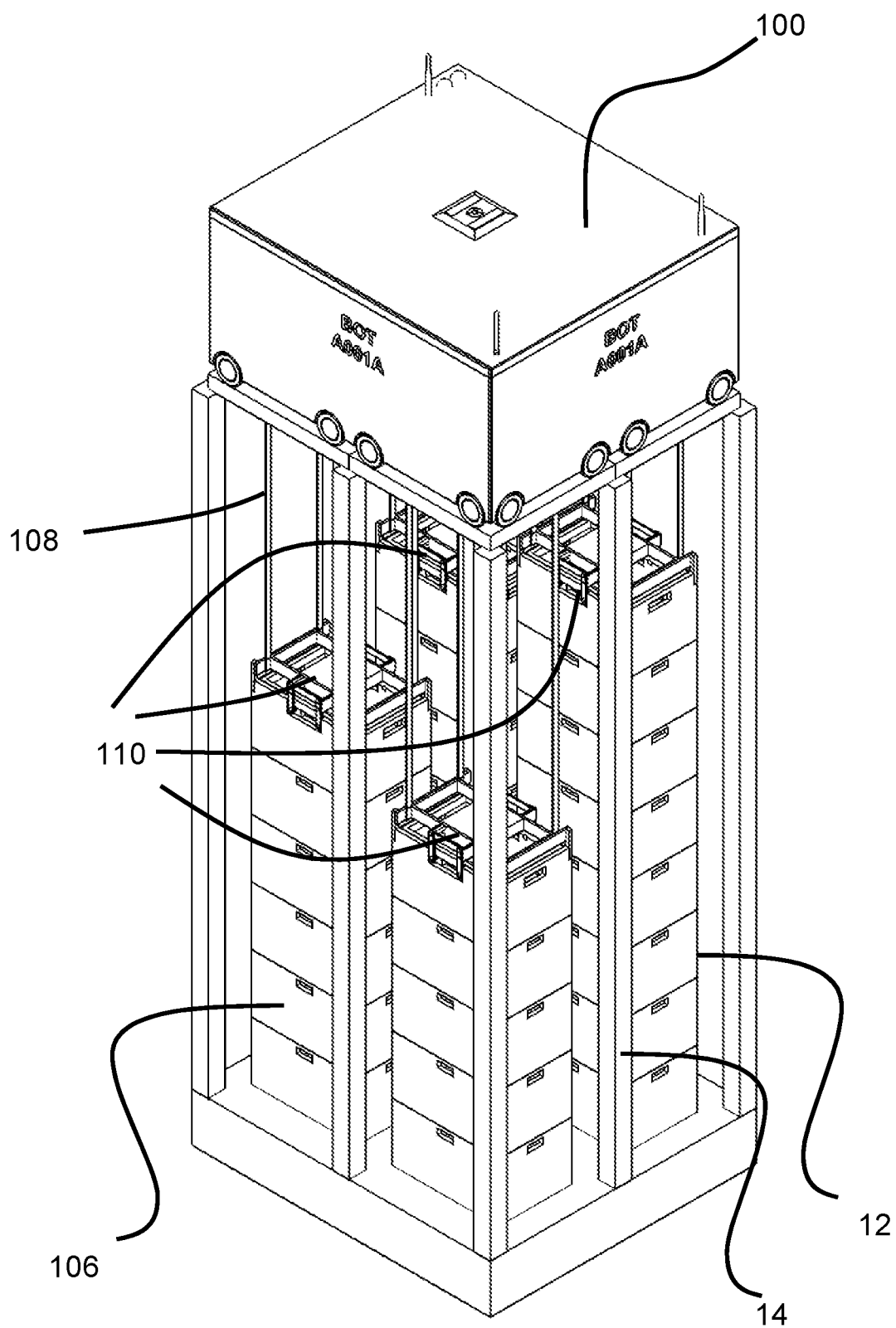
Figure 9:
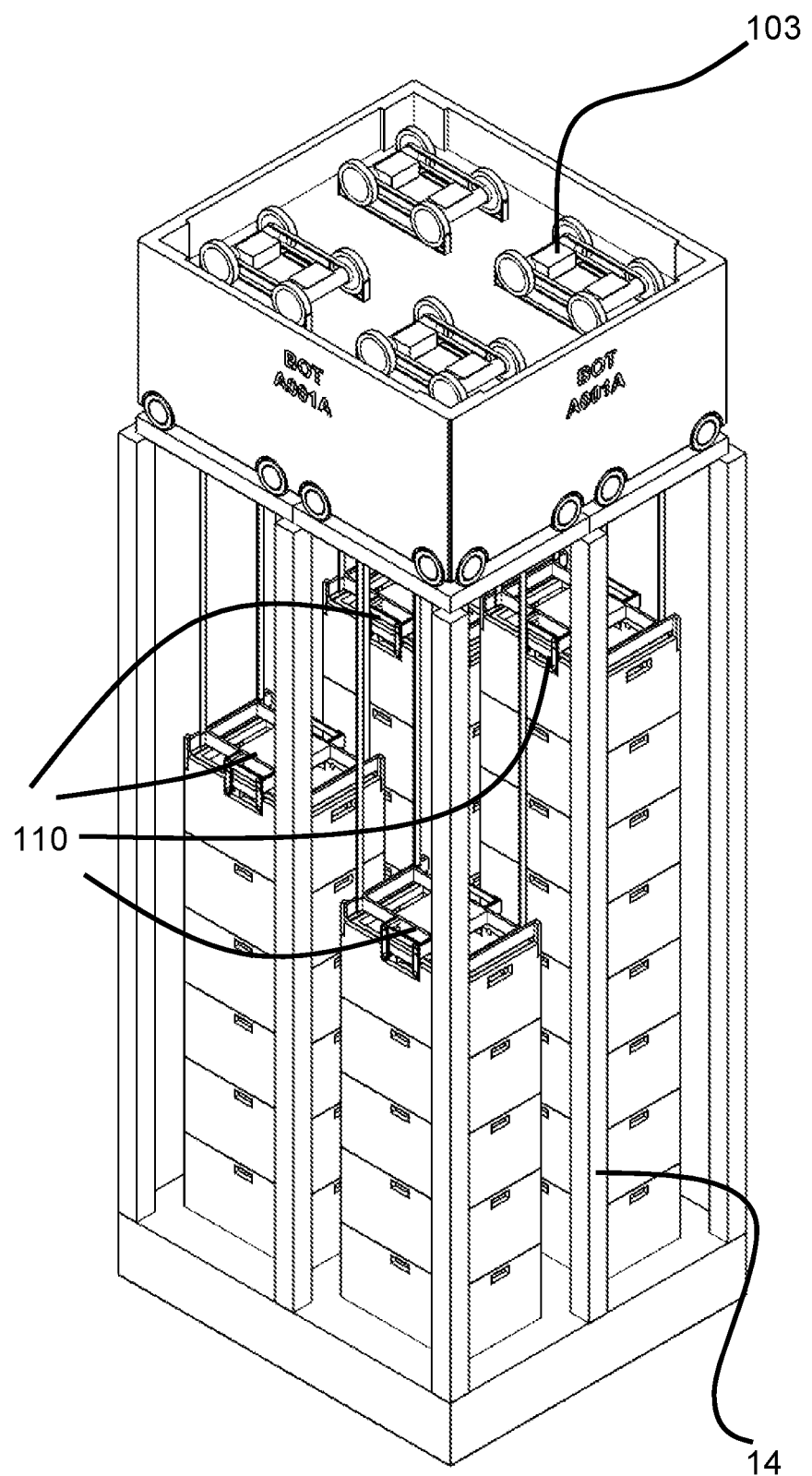
Figure 10:
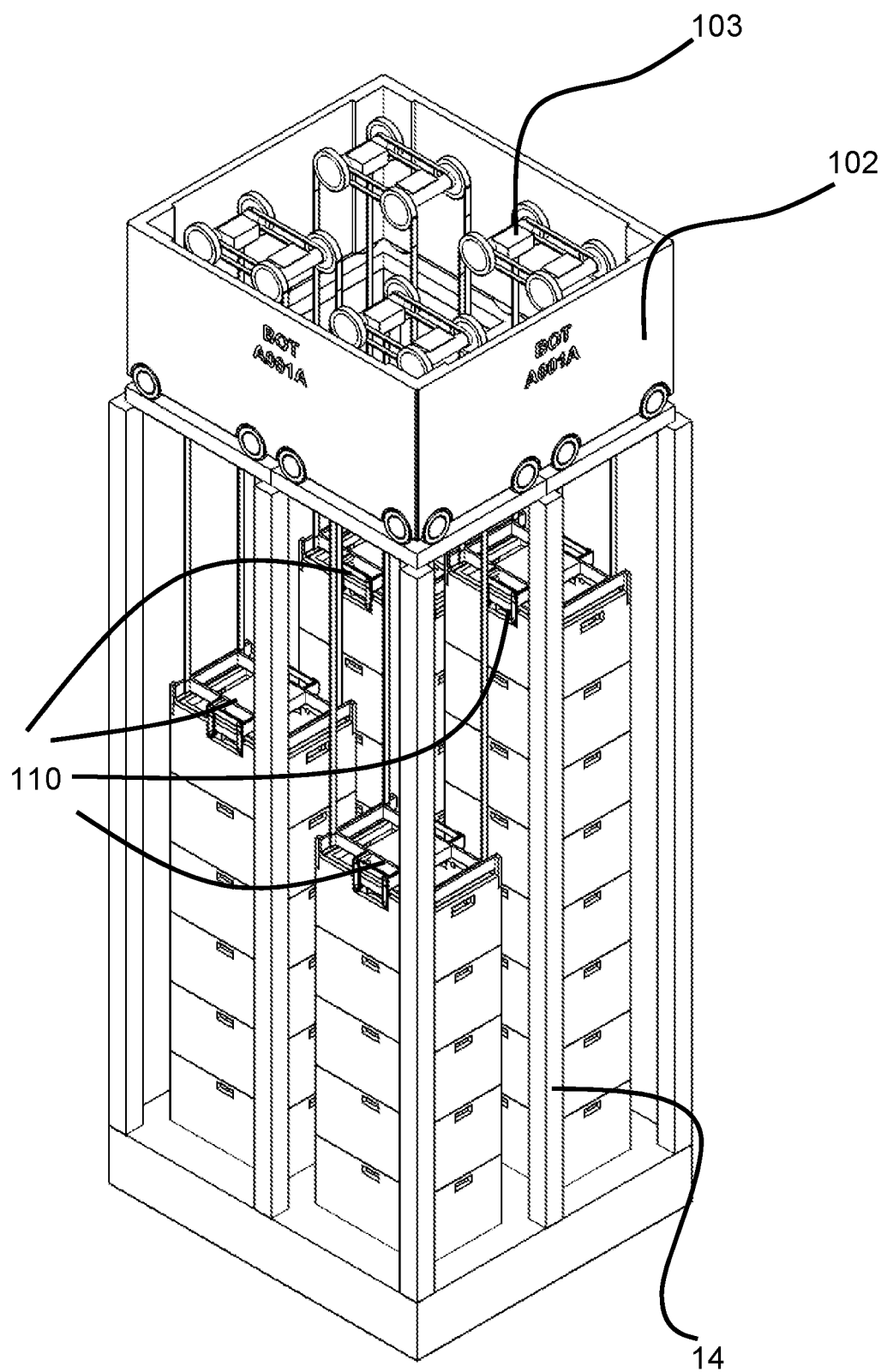
Figure 11:
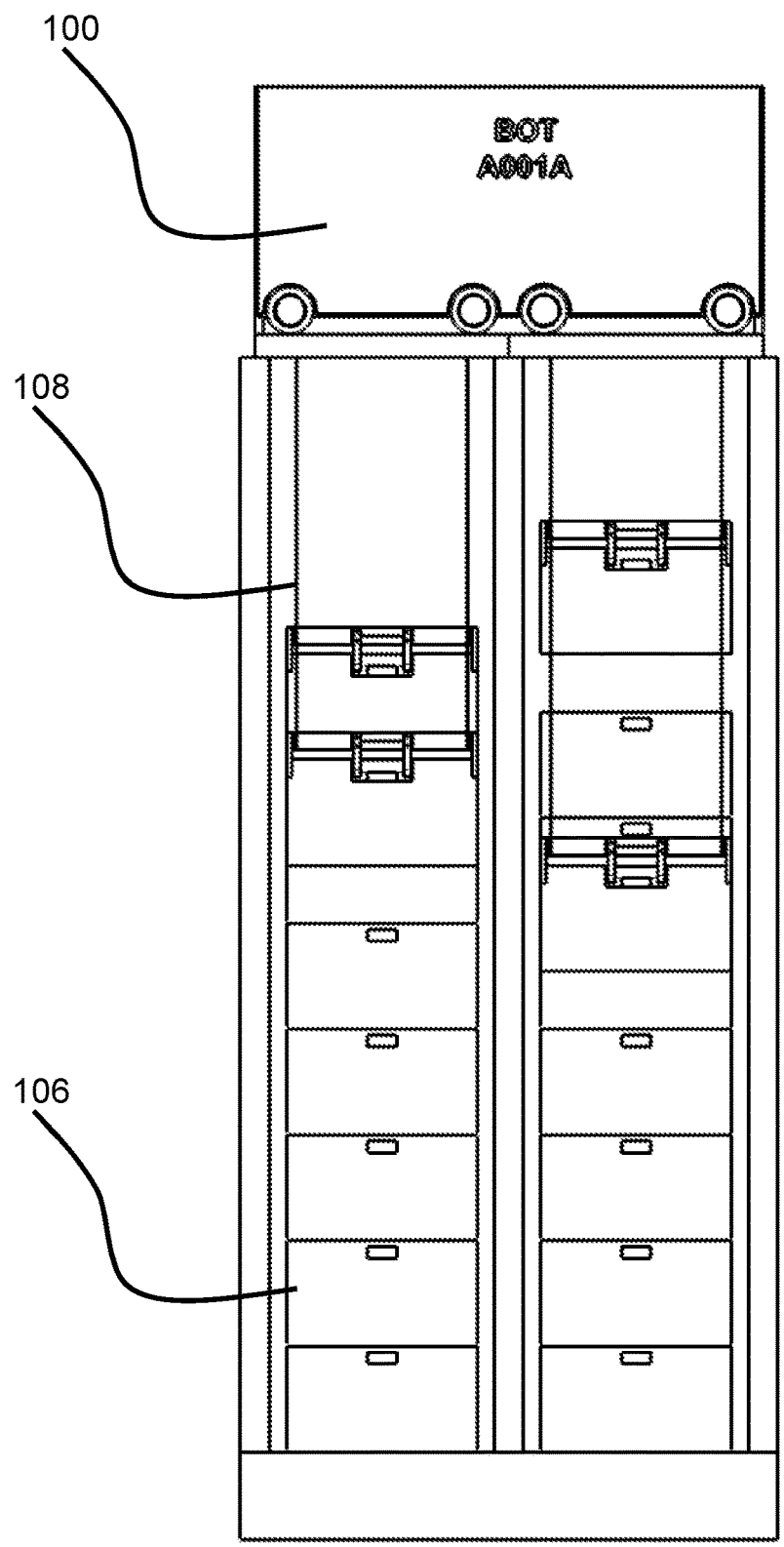
Figure 12:
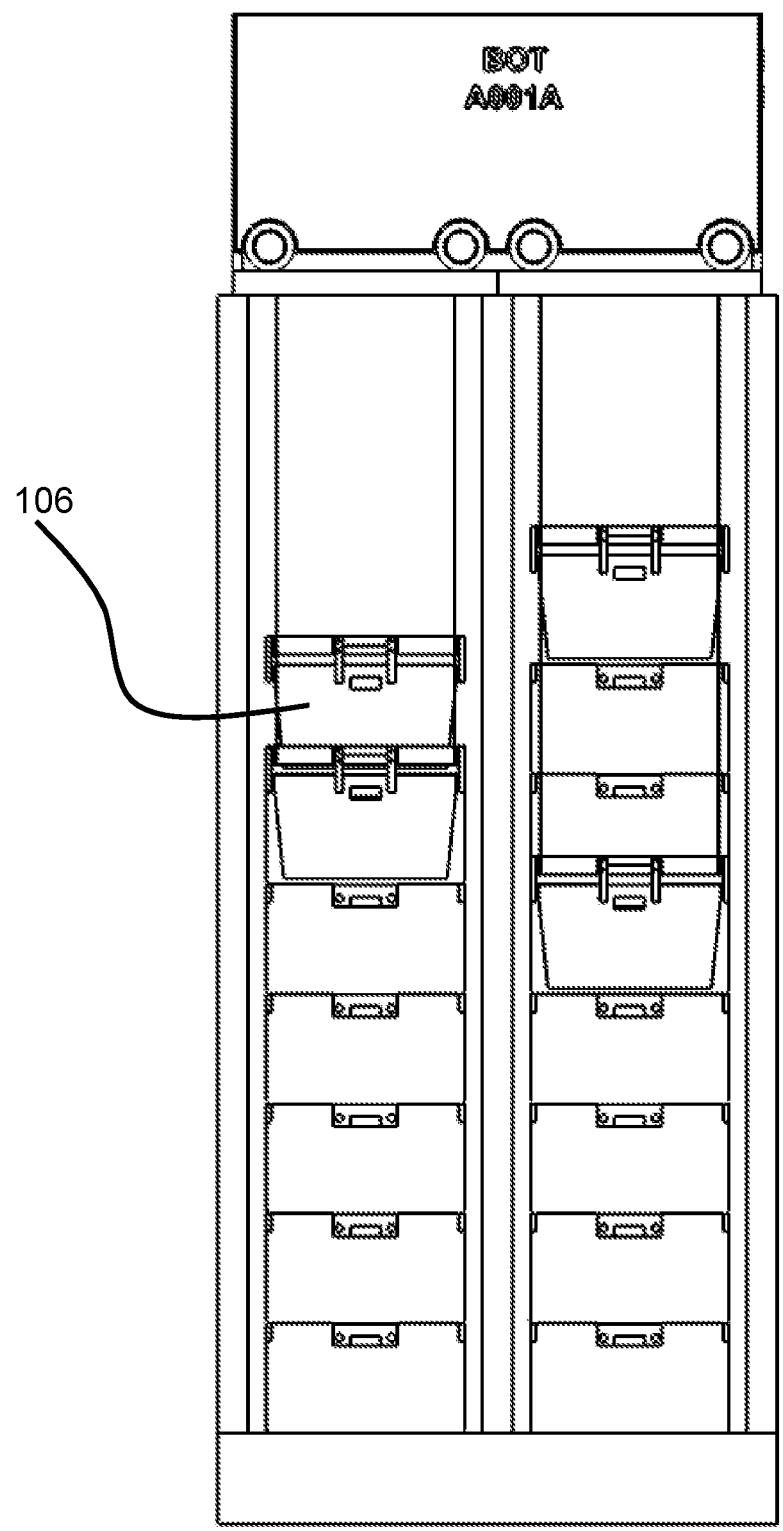
Figure 13:
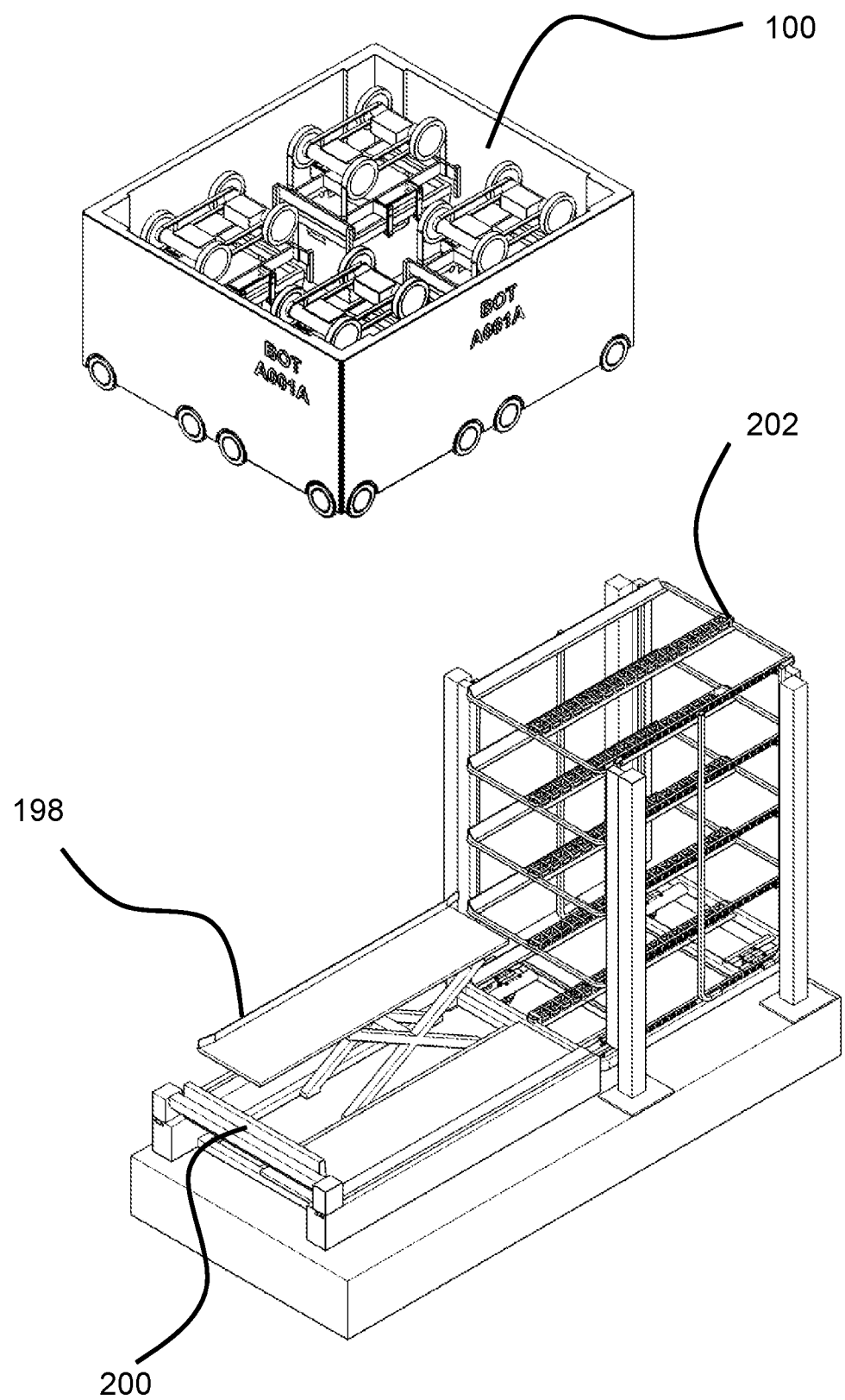
Figure 14:
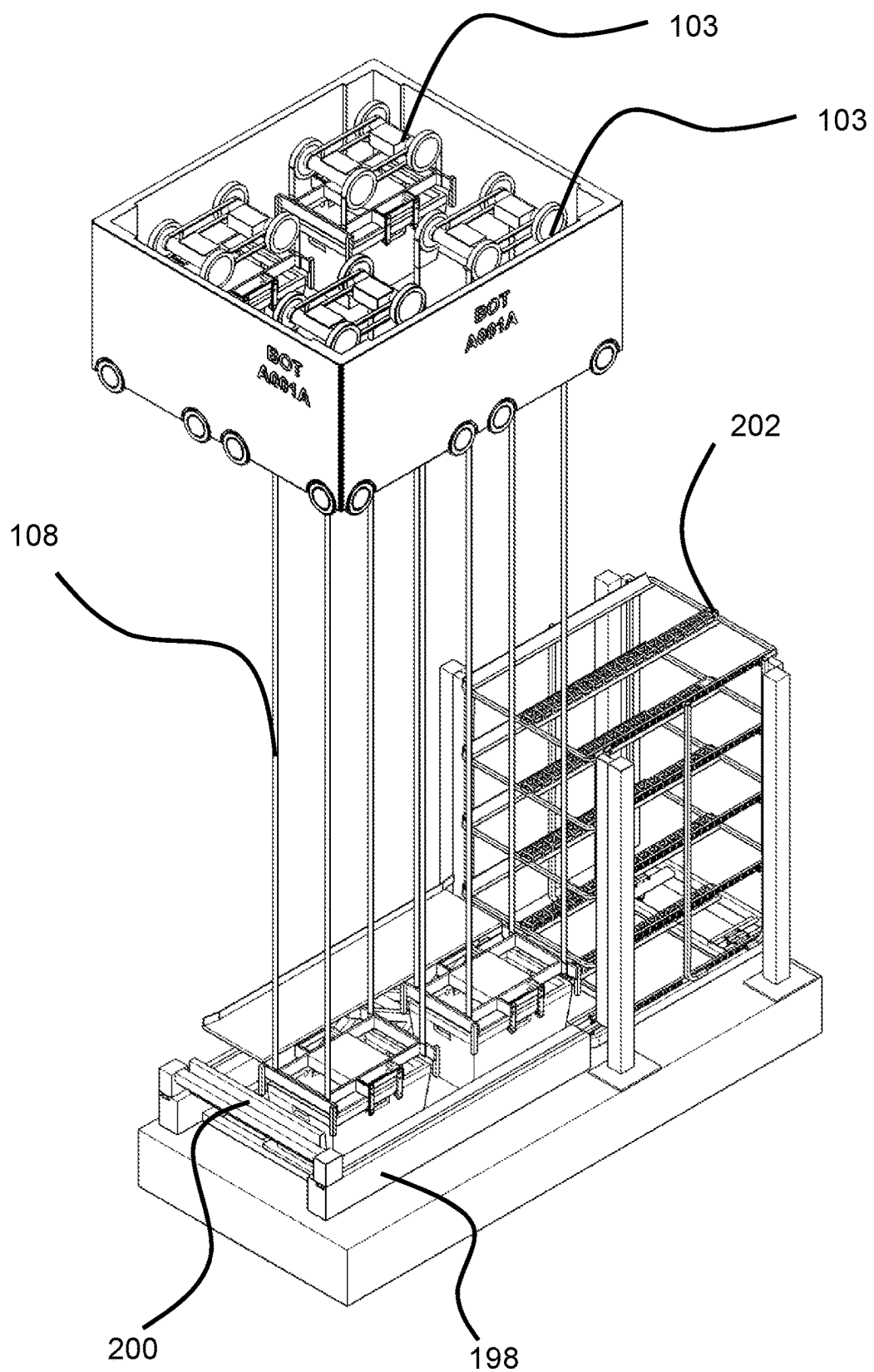
Figure 15:
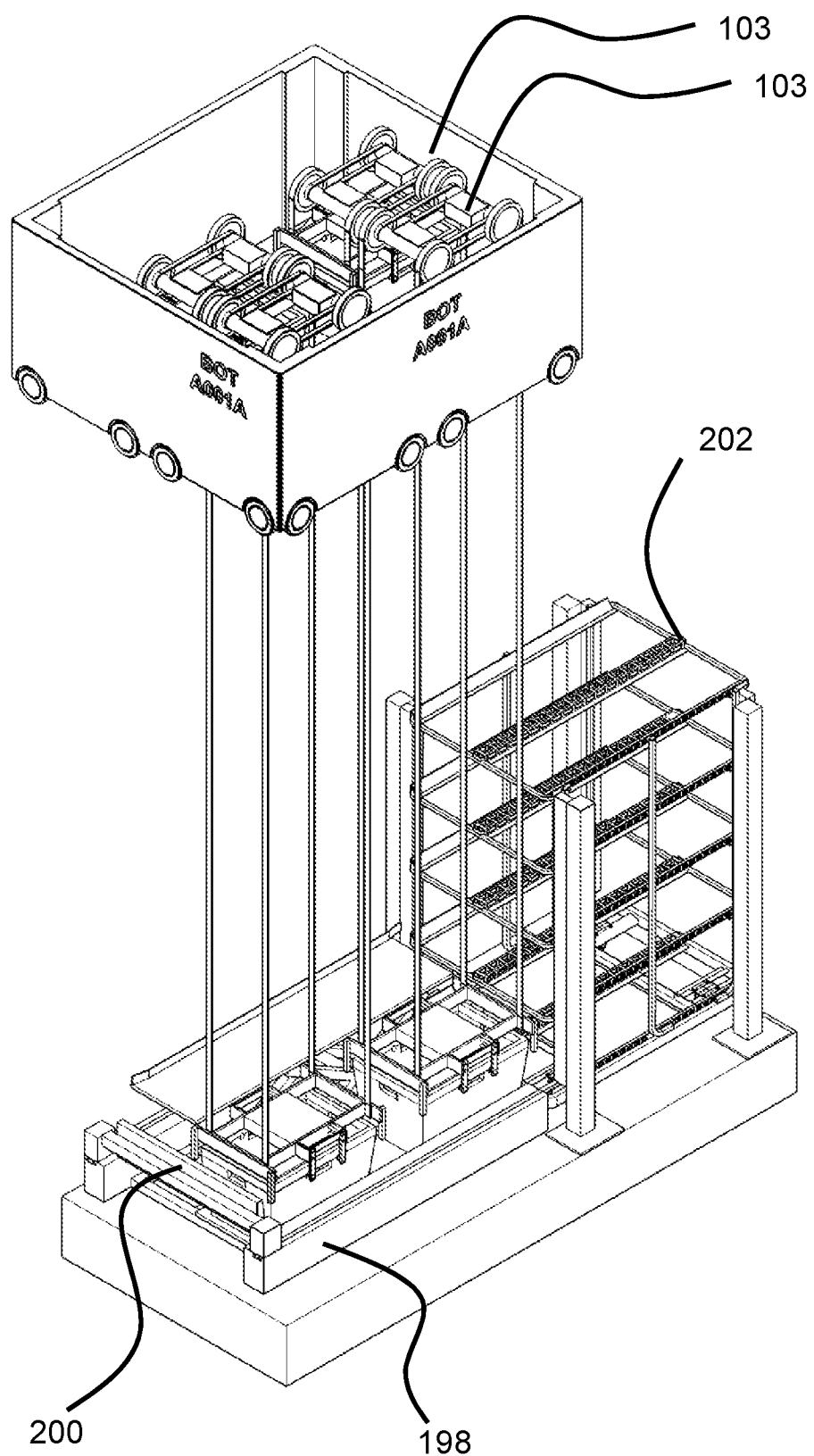
Figure 16:
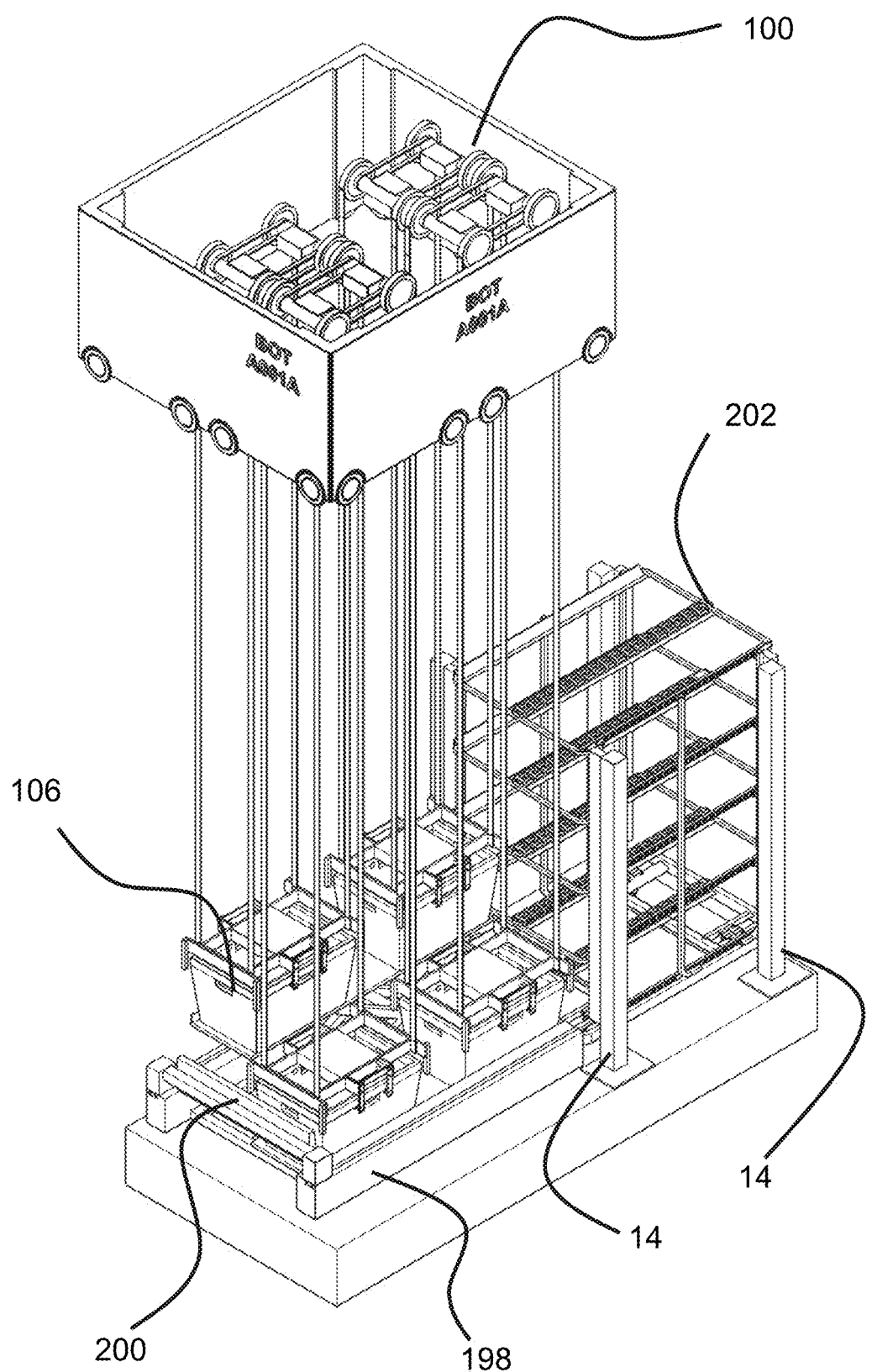
Figure 17:
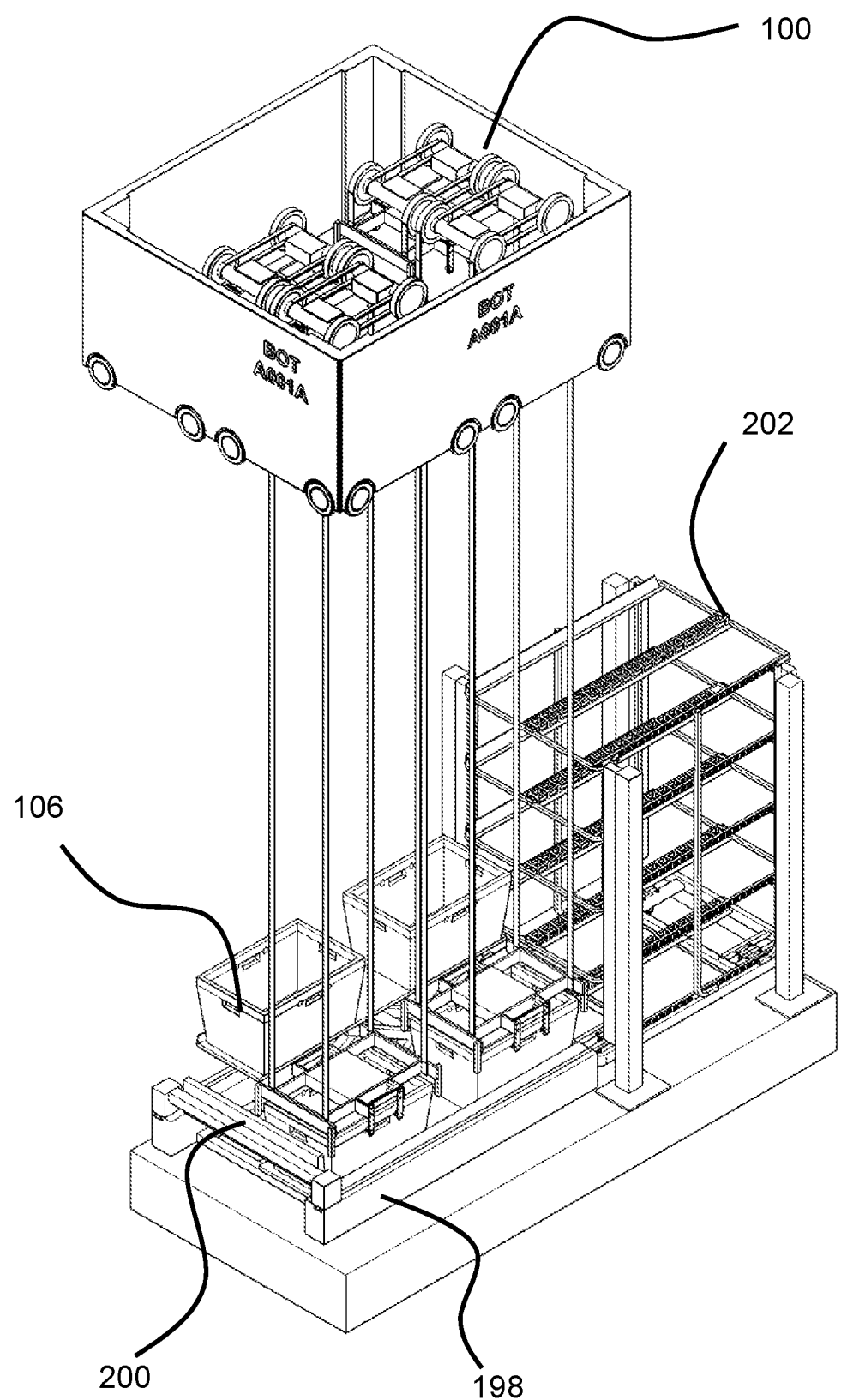
Figure 18:
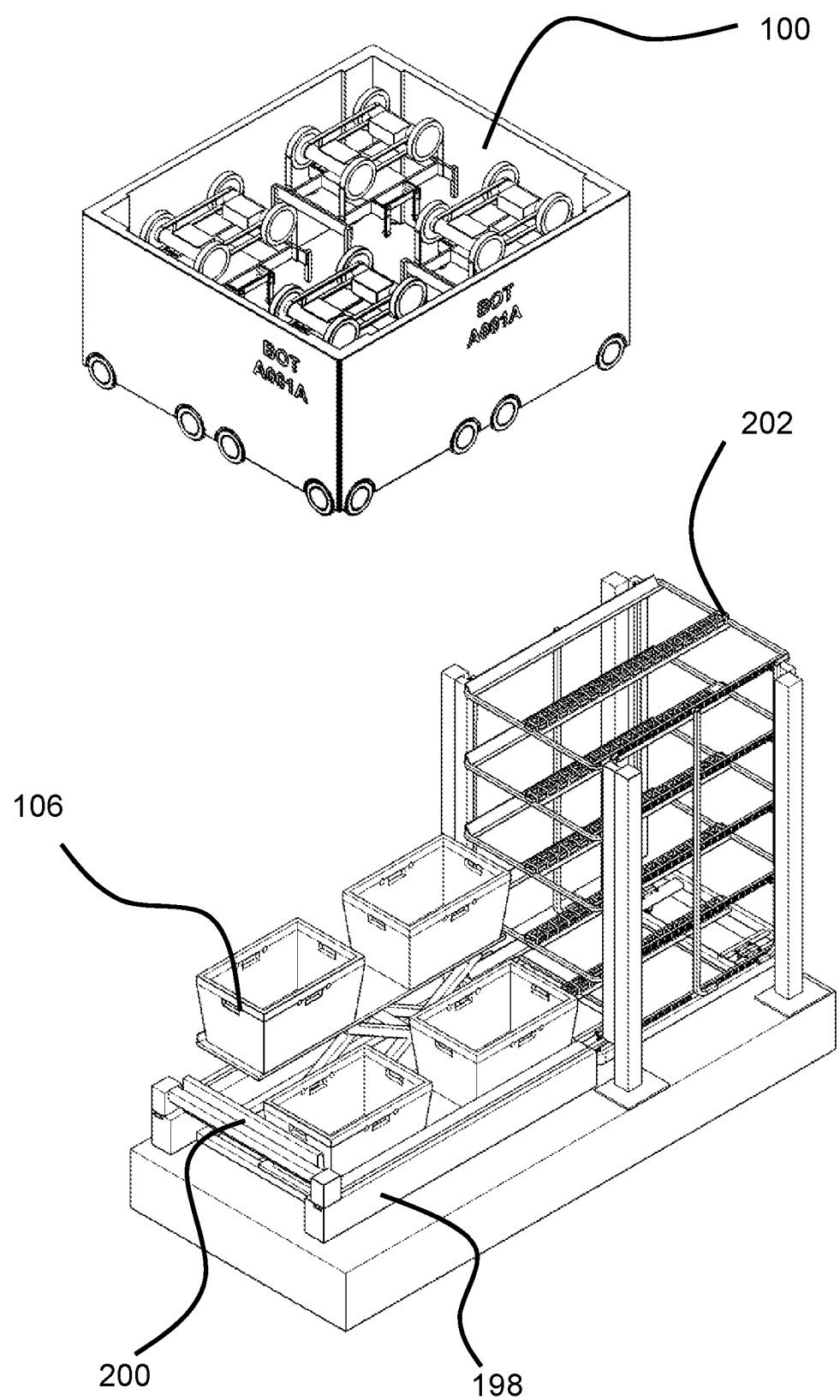
Figure 19:
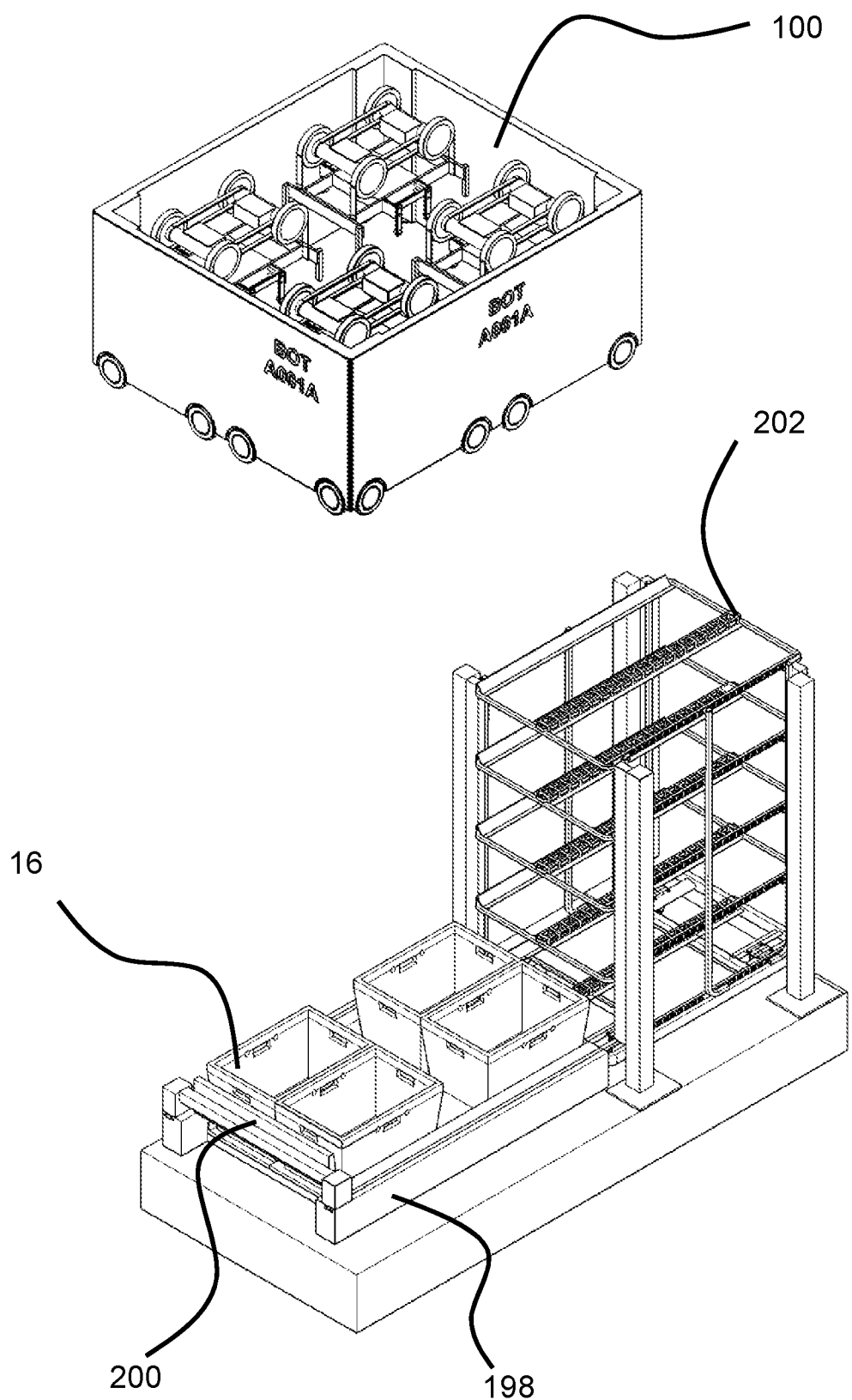
Figure 20:
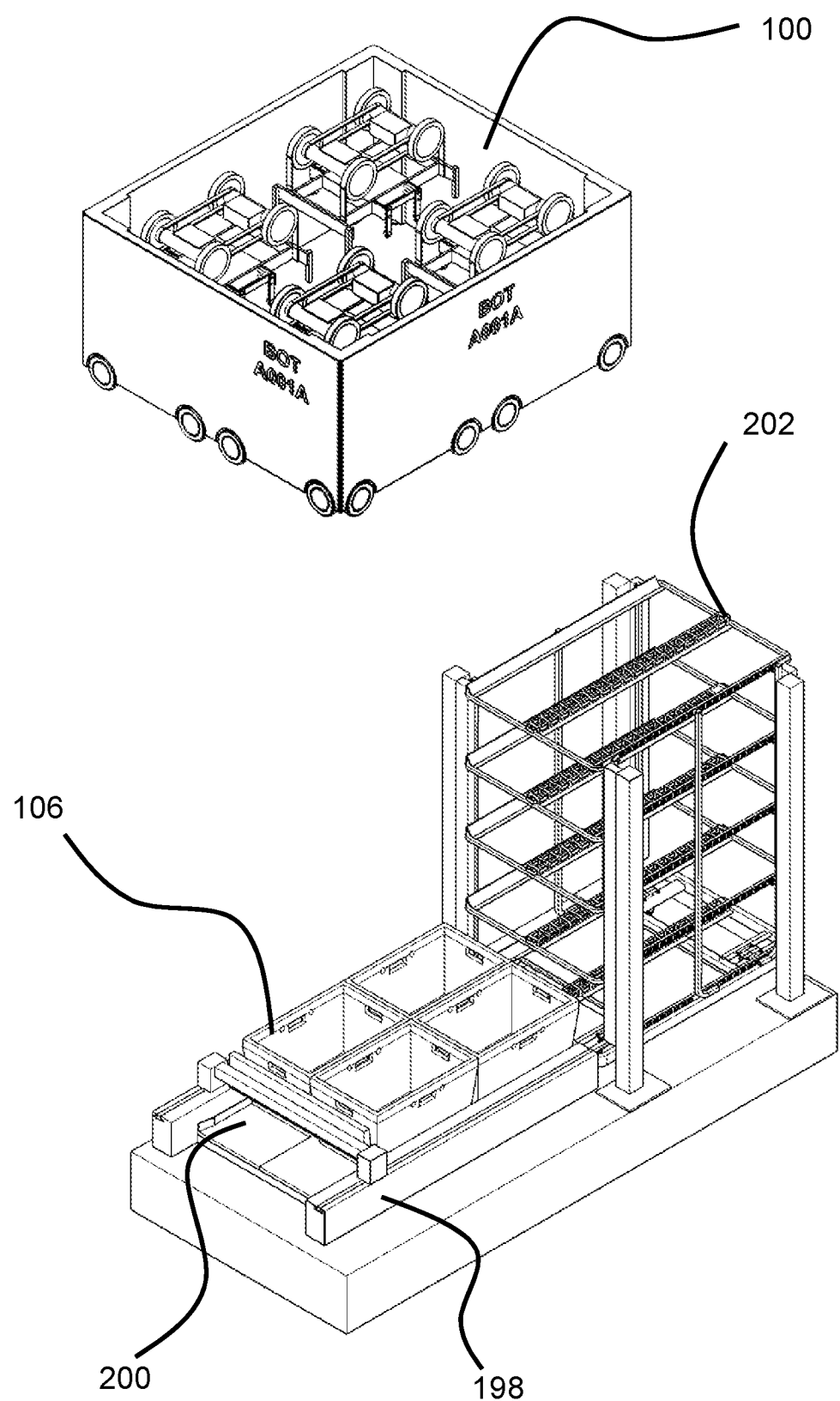
Figure 21:
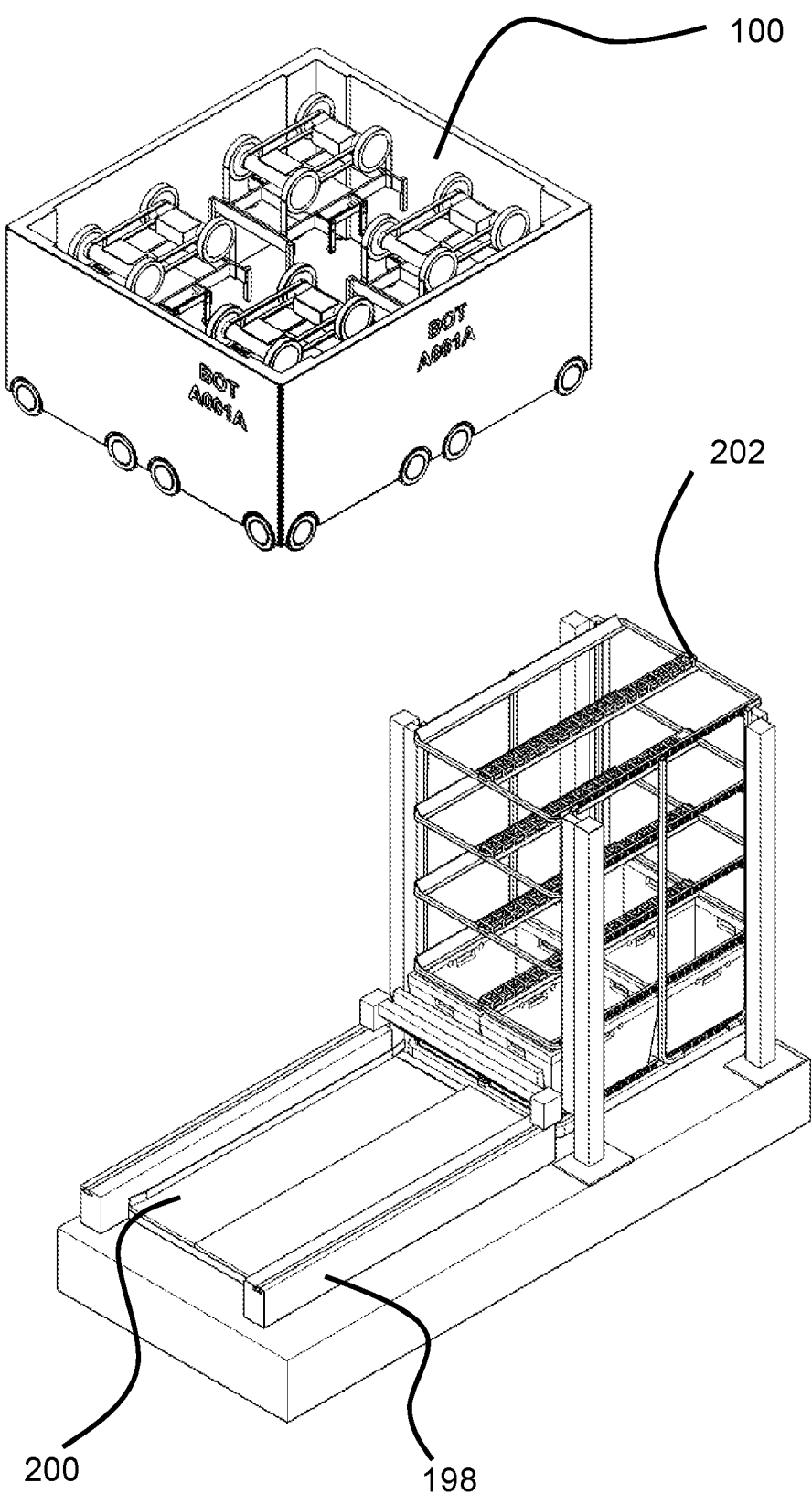
Figure 22:
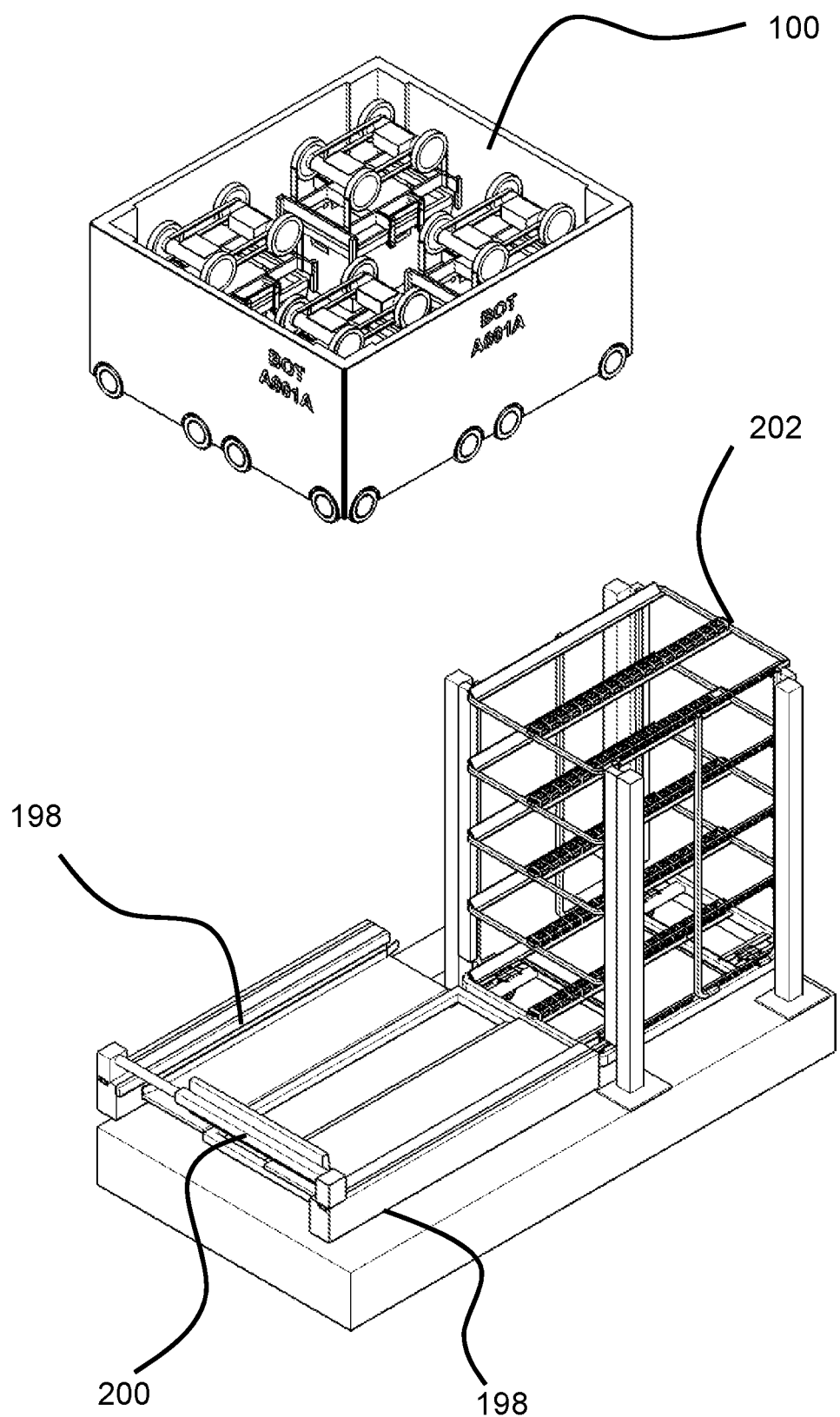
Figure 23:
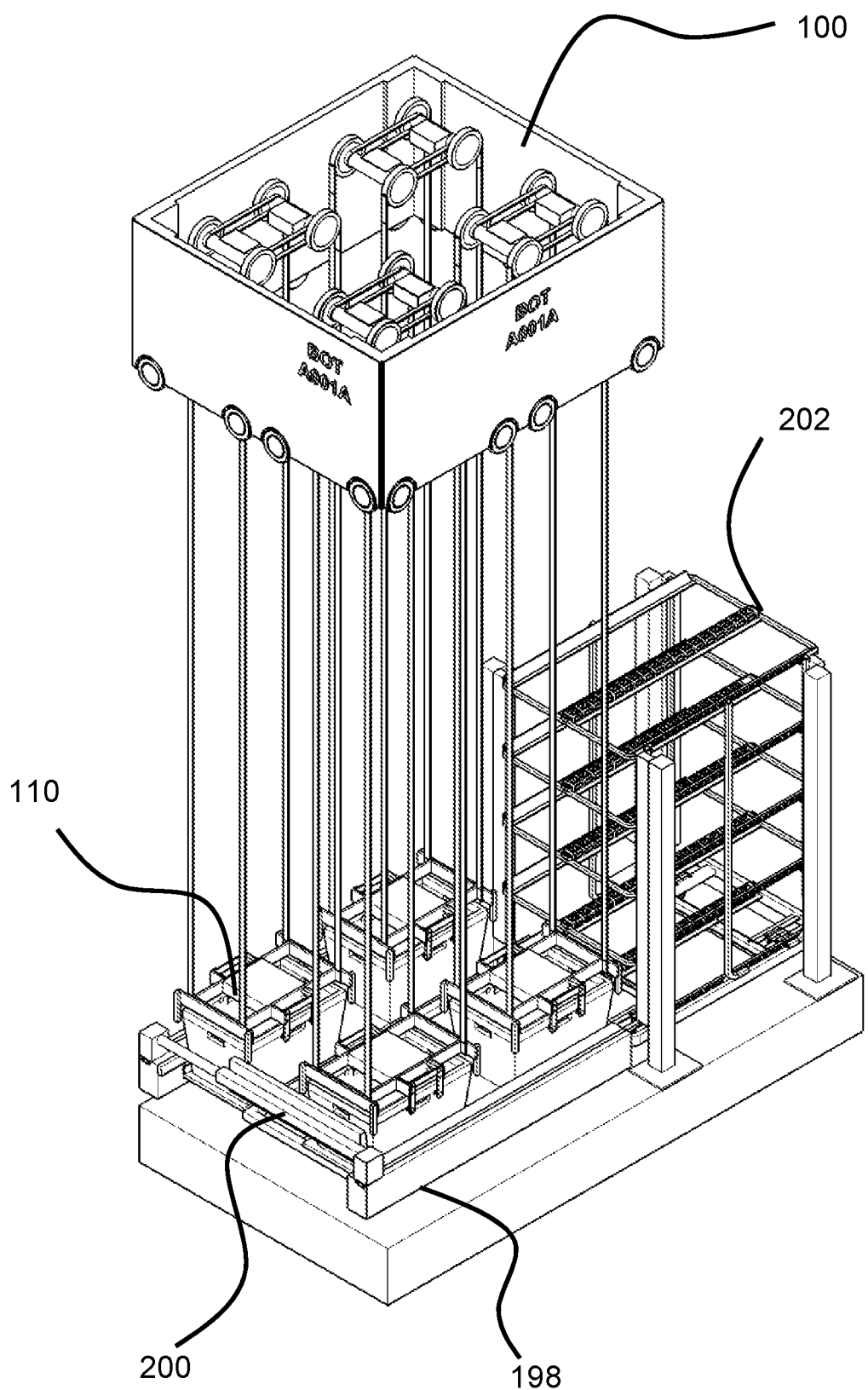
Figure 24:
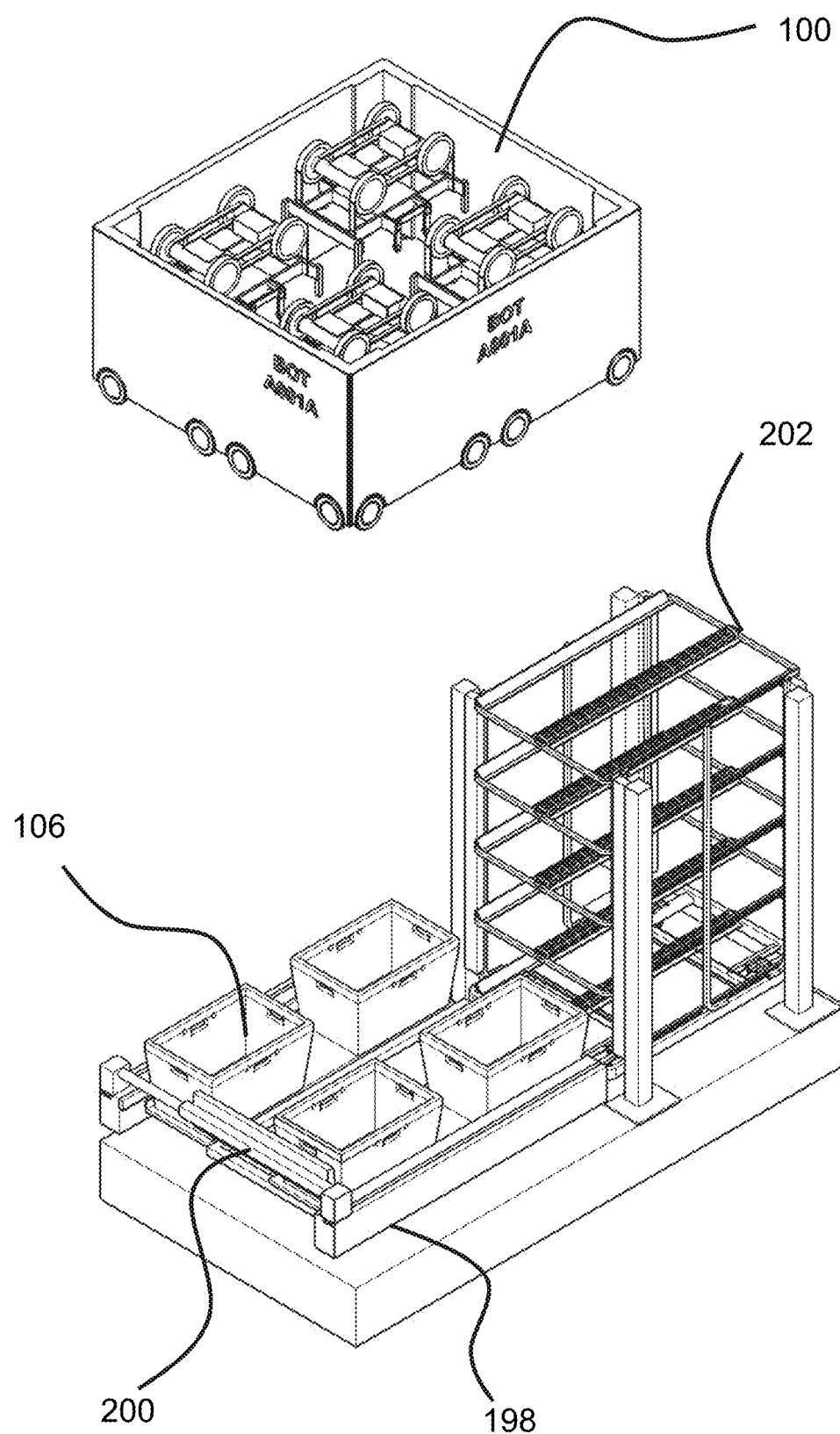
Figure 25:
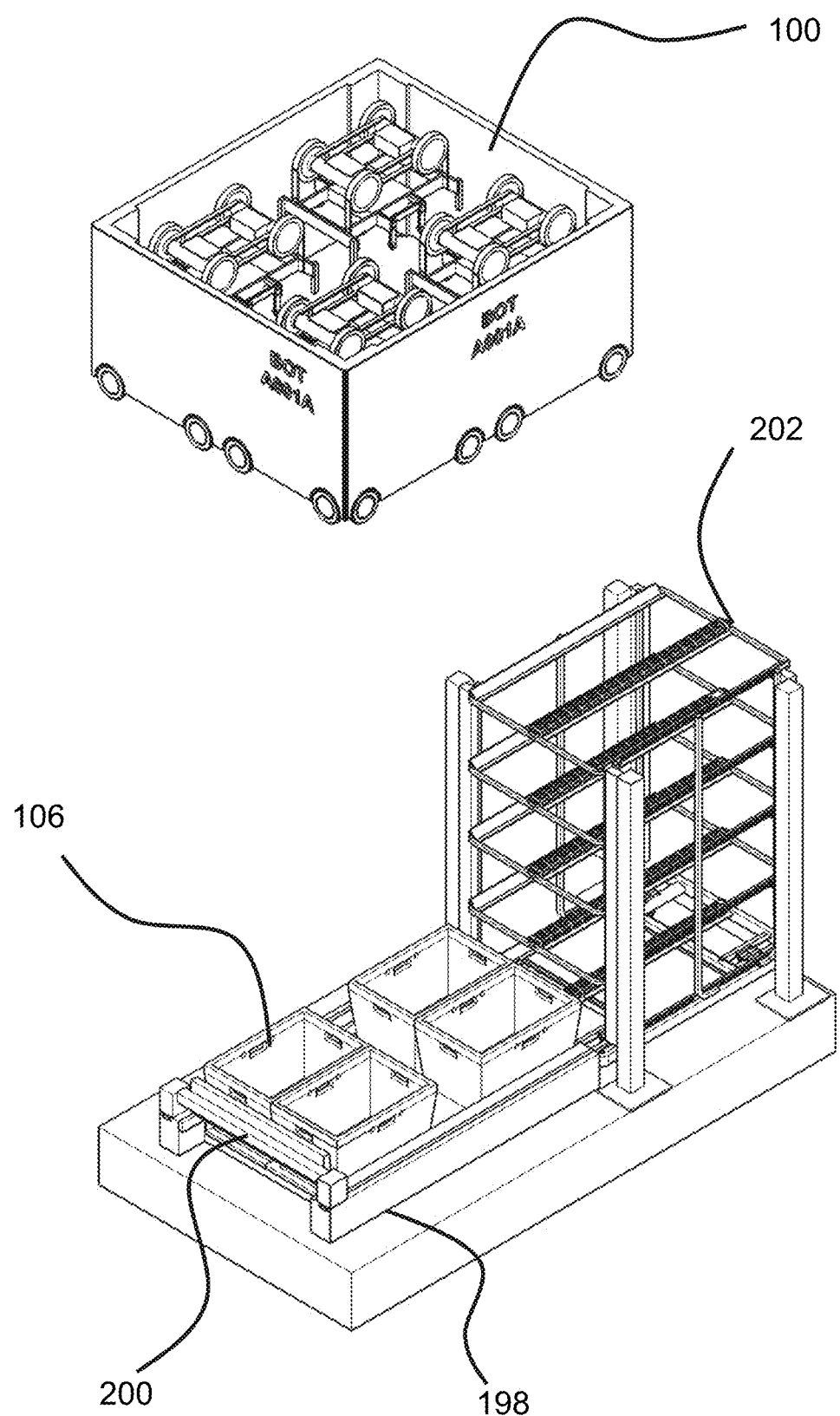
Figure 26:
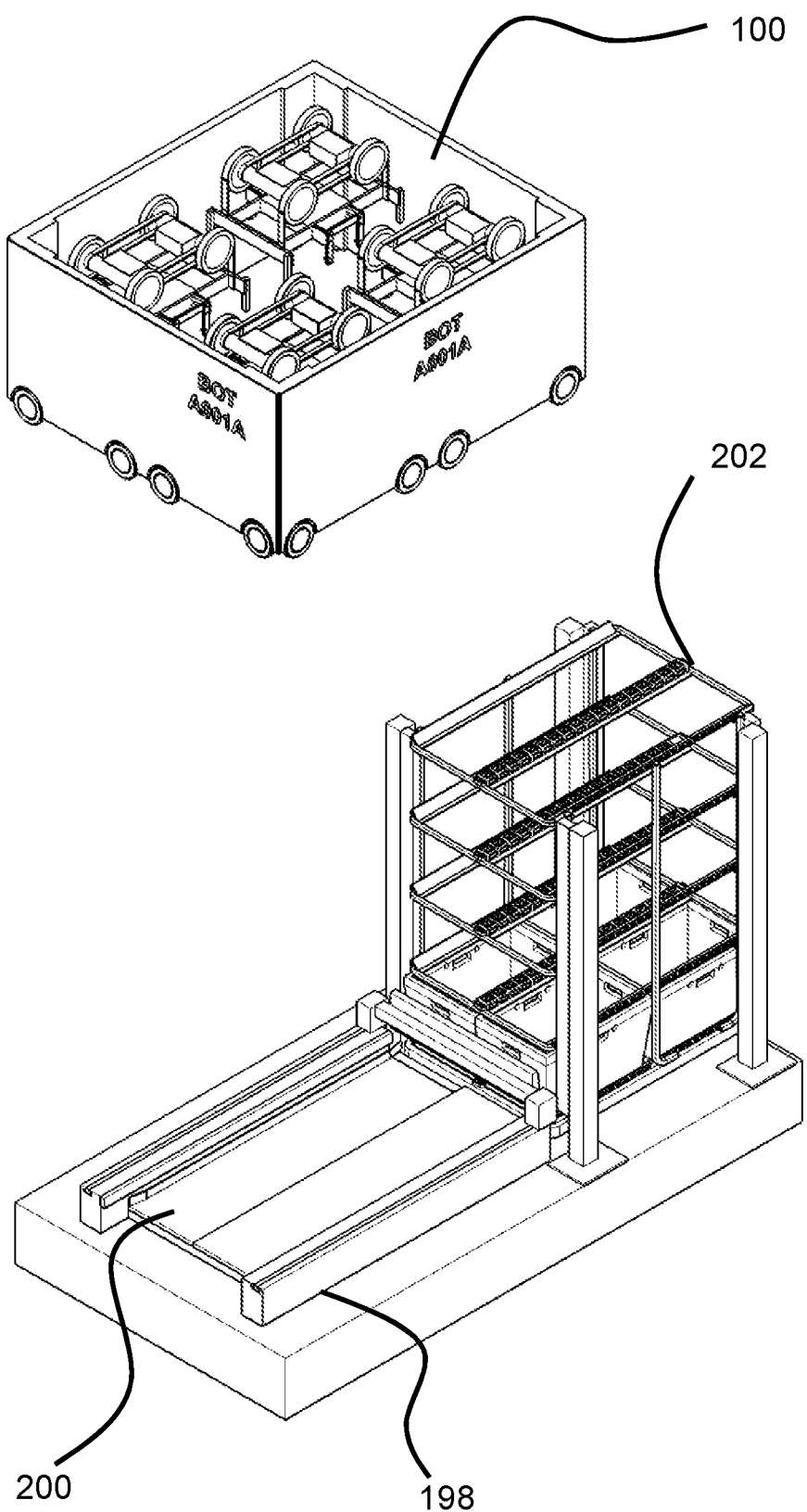

Embodiments of the present invention will now be described, by way of example only, with reference to the remainder of the accompanying drawings, in which like reference numerals are used for like features, and in which:

FIG. 5 is a schematic perspective view of a load handling device according to an embodiment of the invention;

FIGS. 6 and 7 are schematic perspective views of the load handling device of FIG. 5, showing the arrangement of four vehicle modules within the load handling device;

FIG. 8 is a schematic perspective view of a storage system comprising a load handling device in accordance with FIG. 5 installed on the frame structure of FIGS. 1 and 2, the load handling device being in situ above four stacks of containers of the type to be retrieved;

FIGS. 9 and 10 are schematic perspective views of the storage system and load handling device of FIGS. 6 and 7 showing container lifting means associated with each vehicle module engaging with a top container in each stack;

FIGS. 11 and 12 are side views of the load handling device and stacks of FIGS. 9 and 10, the lifting means engaged with containers;

FIG. 13 is a schematic perspective view of one form of port location in a storage system showing a receiving platform and transfer mechanism for transferring delivered containers on to a shipping trolley;

FIG. 14 is a schematic perspective view of the port location of FIG. 13 showing two containers being lowered on to the container receiving platform by the load handling device;

FIGS. 15 and 16 are schematic perspective views of the vehicle modules within the load handling device, showing movement of two of the vehicle modules to enable the containers to be delivered on to the container receiving platform in a position enabling the container transfer mechanism to relocate the delivered containers on to the shipping trolley;

FIGS. 17 and 18 are schematic perspective views of the load handling device in position above a port location in accordance with one form of the invention, showing the container lifting means disengaging from the containers delivered on to the container receiving platform;

FIG. 19 is a schematic perspective view of the load handling device having completely disengaged from the delivered containers, the containers being located on the delivery platform;

FIGS. 20 and 21 are schematic perspective views of the delivered containers in situ on the container receiving platform, delivered by the load handling device of one form of the invention, the delivered containers being transferred via transferring means on to the shipping trolley; and FIGS. 22 to 26 are schematic perspective views showing the load handling device, the vehicle modules and the shipping trolley loading system in accordance with a further form of the invention in which the vehicle module spacing within the load handling device remains constant and the container receiving platform comprises two portions, a first portion being moveable relative to the second portion such that in use, the vehicle modules lower the containers on to the platforms, a portion of the platform moving so as to enable the delivered containers to be transferred to the shipping trolley.

FIG. 5 shows a load handling device 100 according to an embodiment of the invention. The load handling device 100 comprises a vehicle 102 equipped with a plurality of vehicle modules 103, each module 103 comprising winch or crane mechanisms 104 to lift a storage container or bin 106, also known as a tote, from above. The crane mechanisms 104 includes winch cables 108 and grabber plates 110. The grabber plates 110 are configured to grip the top of the containers 106 to lift them from a stack 12 of containers 106 in a storage system of the type shown in FIGS. 1 and 2.

Referring also to FIGS. 6 and 7, the vehicle 102 comprises an upper part 112 and a lower part 114.

The lower part 114 is fitted with two sets of wheels 116, 118, which run on rails provided at the top of the frame of the storage system. At least one wheel of each set 116, 118 is driven to enable movement of the vehicle 102 in X- and Y-directions respectively along the rails. As will be explained below, one or both sets of wheels 116, 118 can be moved vertically to lift each set of wheels clear of the respective rails, thereby allowing the vehicle 102 to move in the desired direction.

The wheels 116, 118 are arranged around the periphery of a cavity or recess 120, known as a container-receiving recess, in the lower part 114. The recess 120 is sized to accommodate the or each bin 106 when it is lifted by the crane mechanism 104, as shown in FIGS. 11 and 12. When in the recess 120, the bin 106 is lifted clear of the rails beneath, so that the vehicle 102 can move laterally to a different location. On reaching the target location, for example another stack 12, an access point in the storage system or a conveyor belt, the bins 106 can be lowered from the recess 120 and released from the grabber plates 110.

The upper part 112 of the vehicle 102 houses all of the significant bulky components of the load handling device, as shown in FIGS. 6 and 7. The upper part 112 houses the battery and associated electronics, controllers and communications devices, motors for driving the wheels 116, 118, motors for driving the crane mechanism 104, and other sensors and systems.

In this way, the footprint of the vehicle 102 is larger than the size of the bins 106 contained within the recess 120 only enough to accommodate the wheels 116, 118 either side of the recess 120. In other words, the vehicle 102 occupies a plurality of grid spaces in the storage system equivalent only to the number of vehicle modules contained within the load handling device 100.

The load handling devices 100 of the invention can also offer improved stability, increased load handling capacity and reduced weight compared to the cantilever-type prior art load handling devices 30, because in the invention the load of the containers is suspended between the pairs of wheels on each side of the vehicle. In contrast, the prior-art devices 30 must have a relatively heavy vehicle module to counterbalance the load in the cantilever configuration.

FIGS. 5 to 21 show one embodiment of the invention. The upper part 112 of the vehicle 102 houses four vehicle modules 103, each module 103 having three main motors: a Z-drive motor used to raise and lower the winch cables 108, which are wound onto spools mounted on drive shafts situated at opposite sides of the vehicle 102; an X-drive motor which drives the first set of wheels 116, and a Y-drive motor which drives the second set of wheels 118. The upper part 112 of the vehicle also houses a battery to power the motors, and controllers, sensors and other components as described above with reference to FIGS. 6 and 7.

Drive is transferred from the X- and Y-drive motors to the respective sets of wheels 116, 118 by means of belt drive mechanisms. The X-drive motor or motors drive pulleys connected to a short drive shaft that extends across the vehicle body. Drive is transferred from the short drive shaft to each wheel in the first set of wheels 116 by an X drive belt. The Y-drive motor drives a pulley connected to a long drive shaft that extends across the vehicle body in a direction perpendicular to the short drive shaft. Drive is transferred from the long drive shaft to each wheel in the second set of wheels 118 by a Y drive belt.

The belt-driven wheels 116, 118 are mounted at the bottom of the lower part 114 of the vehicle 102. The use of drive belts to transfer drive from the motors to the wheels enables the motors to be mounted in the upper part 112 of the vehicle.

In this embodiment, as an example only, the first set of wheels 116 can be raised clear of the rails or lowered onto the rails by means of a wheel positioning mechanism. One form of mechanism may operate as follows: the wheel 116 is mounted on an arm that is pivotally mounted at its outer end. An inner end of each arm is connected to the lower end of a respective linkage. The upper ends of both linkages are connected to the lower end of a common linkage. In turn, the upper end of the common linkage is connected to a lever arm that is moved by a motor. By operating the motor to draw the common linkage upwards, the first set of wheels 116 can be raised so that the second set of wheels 118 alone is engaged with the rails, allowing movement of the vehicle 102 in the Y-direction. By operating the motor to push the common linkage downwards, the first set of wheels 116 move downwards to engage with the rails and to lift the vehicle so that the second set of wheels 118 is lifted clear of the rails. The vehicle 102 can then move in the X-direction.

The wheels 118 of the second set may be mounted to fixed T-pieces disposed at either end of the lower part 114 of the vehicle 102.

It will be appreciated that the wheels need not be arranged around the periphery of the cavity or recess. Indeed, multiple sets of wheels may be provided so as to take advantage of the tracks or rails defining the footprint of the stacks of containers or bins 10.

FIGS. 8, 9 and 12 show the load handling device 100 with bins 106 being lifted into the recess 120. FIG. 11 shows the load handling device 100 with the bin 106 beneath the device 100 and one grabber plate 110 about to engage with one target bin 106. The wheels 116, 118 and the associated support pieces, linkages and drive belts are arranged around the edges of the recess 120, so that the upper part 112 of the vehicle 102 is solidly supported.

Wheels suitable for use as one of the wheels 116, 118 of the load handling device 100 may comprise a toothed central channel that forms a pulley for cooperating with a drive belt. The channel is bounded by two rubber tyres, which bear upon the rails in use. The wheel can be mounted to an arm by way of an axle (not shown) that extends through an axial hole in the wheel. This wheel design is compact and balanced, to minimise wear, and the tyres serve to keep the drive belt in alignment in use.

FIG. 13 is a schematic perspective view of one form of port location in a storage system showing a container receiving platform 198 and transfer mechanism 200 for transferring delivered containers on to a shipping trolley 202.

FIG. 14 is a schematic perspective view of the port location of FIG. 13 showing two containers 106 being lowered on to the container receiving platform 198 by the vehicle modules 103 of the load handling device 100. As can be seen in FIG. 14, the spacing of the containers 106 in the container receiving recess 120 does not match the spacing of the container receiving shelves of the container shipping trolley 202.

FIGS. 15 and 16 are schematic perspective views of the vehicle modules 103 within the load handling device 100, showing movement of two of the vehicle modules 103 to enable the containers 106 to be delivered on to the container receiving platform 198 in a position enabling the container transfer mechanism 200 to relocate the delivered containers 106 on to the shipping trolley 202.

FIGS. 17 and 18 are schematic perspective views of the load handling device 100 in position above a port location in accordance with one form of the invention, showing the container lifting means 110 disengaging from the containers 106 delivered on to the container receiving platform 198.

FIG. 19 is a schematic perspective view of the load handling device 100 having completely disengaged from the delivered containers 106, the containers 106 being located on the delivery platform 198.

FIGS. 20 and 21 are schematic perspective views of the delivered containers 106 in situ on the container receiving platform 198, delivered by the load handling device 100 of one form of the invention, the delivered containers 106 being transferred via transferring means on to the shipping trolley 202.

In use, two of the vehicle modules 103 lower a first two containers 106 on to one portion of the container receiving platform 198. Once the first two containers 106 are lowered on to the platform, the opposing two vehicle modules 103 move within the body of the load handling device to a position above a second portion on the container receiving platform 198. The vehicle modules 103 lower the two containers 106 on the container lifting means on to the second portion of the platform 198. Once all four of the containers 106 are in the correct position on the container receiving platform 198, the grippers 110 are winched back in to the load handling device 100, the vehicle modules reposition and the load handling device 100 is free to be moved under the control of the communications and control system to a different location.

The four containers 106 on the container platform 198 are transferred by suitable transferring means 200 on to the shipping trolley 202. The transferring means may comprise a push plate mechanism, a conveyor mechanism or any other suitable form of transferring mechanism for moving the containers 106 on to the shipping trolley 202.

It will be appreciated that in the embodiments of the invention described above, the load handling device is adapted to retrieve four containers 106 in a 2×2 arrangement but that any other arrangement of containers 106 and vehicle modules 103 may be used, for example 1×2, 1×3, 2×3, and 3×3 or more may be envisaged. In the case where a different number of containers 106 are envisaged, the container receiving platform would also need to be adapted to accept the corresponding number of containers 106.

It will be appreciated that in these different container-vehicle module arrangements, it may be especially advantageous for the wheels not to be arranged around the periphery of the cavity or recess. Indeed, it may be necessary for multiple sets of wheels to be provided so as to take advantage of the tracks or rails defining the footprint of the stacks of containers or bins 10.

FIGS. 22 to 26 are schematic perspective views showing the load handling device 100, the vehicle modules 103 and the shipping trolley 202 loading system 200 in accordance with a further form of the invention in which the vehicle module 103 spacing within the load handling device 100 remains constant and the container receiving platform 198 comprises two portions. A first portion of the platform 198 is moveable relative to the second portion of the platform 198 such that in use, the fixed position vehicle modules 103 lower the containers 106 on to the portions of the platform 198 by means of the container lifting device and gripper 110 mechanism. A portion of the platform 198 moves so as to enable the delivered containers 106 to be transferred to the shipping trolley 202.

It will be appreciated that the load handling device 100 and the container receiving platform 198 are acting so as to adjust the pitch or spacing of the containers 106 to enable mismatches between container stack 12 pitch and shipping trolley container pitch 110. However, it will be appreciated similar method and apparatus may be used to compensate for a mismatch in spacing or pitch at other points in the process or system.

It will be appreciated that many different variations and modifications are possible. For example, both sets of wheels may be powered by a single motor, with a suitable transfer arrangement to direct power to the appropriate set of wheels. Instead of a motor, the mechanism used to lift the wheels may use linear actuators, such as linear motors or hydraulic rams.

The mechanism used to lift containers into the container-receiving space could take any suitable form. For maximum stability and load capacity, it is desirable to provide four lifting cables, with one cable disposed near each of the corners of the device, but a different arrangement, for example with fewer cables, could be used if desired. Conveniently, all of the cables are spooled and unspooled using a single motor, but more than one motor could be used if desired.

It will be appreciated that that the individual lifting mechanisms may be configured so as to lift a larger container, said larger container being of equivalent footprint to an integer number of containers.

Other variations and modifications not explicitly described above will also be apparent to the skilled reader.

The invention claimed is:

1. A load handling device for lifting and moving containers stacked in a storage system, the storage system having a plurality of rails or tracks arranged in a grid pattern above stacks of containers, the grid pattern being a plurality of grid spaces and each stack being located within a footprint of only a single grid space, the load handling device configured to move laterally on rails or tracks above stacks of containers, the load handling device including:
   a container receiving space arranged to be located above such rails or tracks when in use; and
   a plurality of vehicle modules, the vehicle modules each having a container lifting means, each container lifting means arranged to lift a container such that the load handling device is arranged to lift a corresponding number of containers as vehicle modules into the container receiving space from a corresponding number of stacks.

2. A load handling device according to claim 1, in which the vehicle modules are configured to be moveable above the container receiving space, with the vehicle modules being adjustable relative to a first footprint having a first size corresponding to a first number of stacks such that movement of a vehicle module will allow containers to be retrieved and deposited from and to locations having a second footprint having a second size corresponding to a second number of stacks, the vehicle modules being controlled by an adjustment means in the load handling device.

3. A load handling device according to claim 2, in which each vehicle module comprises:
   an upper part, and a lower part, the upper part housing one or more of power components, control components, drive components or lifting and lowering components, and the lower part including the container receiving space, wherein the lower part is arranged directly below the upper part.

4. A load handling device according to claim 3, in which the device comprises:
   an external housing that substantially encloses the container receiving space.

5. A load handling device according to claim 4, in which the housing is shaped substantially as a cuboid.

6. A load handling device according to claim 5, in which the load handling device is configured to move in a first direction along a first set of rails or tracks and in a second direction along a second set of rails or tracks wherein the second direction is substantially perpendicular to the first direction.

7. A load handling device according to claim 6, wherein the load handling device comprises:
   a wheel assembly having a first set of wheels for engaging with the first set of rails or tracks, and a second set of wheels for engaging with the second set of rails or tracks to guide movement of the device in the second direction.

8. A load handling device according to claim 7, comprising:
   means for selectively engaging and disengaging the first set of wheels with the first set of rails or tracks; and
   means for selectively engaging and disengaging the second set of wheels with the second set of rails or tracks.

9. A load handling device according to claim 1, in combination with a storage system comprising:
   a first set of parallel rails or tracks; and
   a second set of parallel rails or tracks extending substantially perpendicularly to the first set of rails or tracks to form a grid having a plurality of grid spaces.

10. A load handling device and storage system combination according to claim 9, comprising:
    a port location, the port location having a container receiving means with platform means and transferring means, the platform means and the transferring means together being configured to receive a plurality of containers from the load handling device and to transfer said containers to a shipping means.

11. A load handling device and storage system combination according to claim 10, in which the transferring means comprises:
    a push plate or a lift mechanism.

12. A load handling device and storage system combination according to claim 11, in which the platform means comprises:
    at least one moveable portion such that the platform means of the container receiving means is configured to be adjustable to compensate for differences between a footprint of a pitch of the stacks and a pitch of the shipping means.

13. A load handling device and storage system combination according to claim 10, in which the platform means comprises:
    at least one moveable portion such that the container receiving platform is configured to compensate for differences between a footprint of a pitch of the stacks and a pitch of the shipping means.

14. A method of transferring a plurality of containers located within a plurality of adjacent stacks in a storage system from the storage system to a shipping trolley via a load handling device configured to move laterally on rails or tracks with a container receiving space arranged to be located above such rails or tracks when in use, the method comprising:
   a. retrieving a plurality of containers from a correspondingly numbered plurality of stacks;
   b. transporting the containers in the load handling device, the load handling device having a plurality of vehicle modules, the vehicle modules each having a container lifting means configured to lift a container, wherein the load handling device is configured to lift a corresponding number of containers as vehicle modules into the container receiving space from a corresponding number of stacks;
   c. delivering the containers to a port location;
   d. lowering the containers onto a container receiving platform;
   e. adjusting a spacing of the containers via adjustment means; and
   f. loading the containers onto the shipping trolley.

15. A method according to claim 14, in which the adjusting of the spacing of the containers occurs in the load handling device via the adjustment means.

16. A method according to claim 14, in which the adjusting of the spacing of the containers occurs at the container receiving platform.

17. A method according to claim 14, wherein an external housing substantially encloses the container receiving space.

18. A method according to claim 14, wherein the load handling device is configured to move in a first direction along a first set of rails or tracks and in a second direction along a second set of rails or tracks wherein the second direction is substantially perpendicular to the second direction.

\* \* \* \* \*